US012594986B2

(12) United States Patent
Saigo et al.

(10) Patent No.: US 12,594,986 B2
(45) Date of Patent: Apr. 7, 2026

(54) VEHICLE STEERING ASSIST DEVICE

(71) Applicant: TOYOTA JIDOSHA KABUSHIKI KAISHA, Toyota (JP)

(72) Inventors: Shintaro Saigo, Nisshin (JP); Shusaku Sugamoto, Toyota (JP); Satoshi Inoue, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 574 days.

(21) Appl. No.: 18/112,134

(22) Filed: Feb. 21, 2023

(65) Prior Publication Data

US 2023/0347970 A1 Nov. 2, 2023

(30) Foreign Application Priority Data

Apr. 28, 2022 (JP) ................................. 2022-075170

(51) Int. Cl.
*B62D 5/04* (2006.01)

(52) U.S. Cl.
CPC ......... *B62D 5/0466* (2013.01); *B62D 5/0421* (2013.01); *B62D 5/0463* (2013.01)

(58) Field of Classification Search
CPC .. B62D 5/0466; B62D 5/0421; B62D 5/0463; B62D 6/002; B62D 6/00; B62D 5/04; B62D 6/007; B62D 15/025
See application file for complete search history.

(56) References Cited

U.S. PATENT DOCUMENTS

| | | | | |
|---|---|---|---|---|
| 10,351,168 B2 * | 7/2019 | Tsubaki | ............... | B62D 15/025 |
| 10,933,909 B2 * | 3/2021 | Kodera | ................ | B62D 1/166 |
| 11,738,798 B2 * | 8/2023 | Tamaizumi | ............ | B62D 5/006 |
| | | | | 180/446 |
| 2014/0229068 A1 * | 8/2014 | Ueyama | ................ | B60W 10/20 |
| | | | | 701/41 |
| 2015/0088383 A1 * | 3/2015 | Kodato | ................ | B62D 5/0463 |
| | | | | 701/41 |
| 2017/0066475 A1 * | 3/2017 | Kudo | ........................ | B62D 6/10 |
| 2017/0066476 A1 | 3/2017 | Kudo | | |

(Continued)

FOREIGN PATENT DOCUMENTS

| | | | | | |
|---|---|---|---|---|---|
| CN | 104583057 A | * | 4/2015 | ............. | B62D 1/286 |
| CN | 104661898 A | * | 5/2015 | ............. | B62D 1/286 |

(Continued)

*Primary Examiner* — Drew J Brown
(74) *Attorney, Agent, or Firm* — Sughrue Mion, PLLC

(57) ABSTRACT

A vehicle steering assist device in which the steering assist ECU calculates a target steering angle for driving a vehicle along a traveling path, and is vehicle steering assist device that a calculates a target steering guide torque for facilitating the steering angle to become a target steering angle by reducing a return torque for urging the steering wheel to a neutral position in an area where the steering angle is smaller than the target steering angle, wherein when the steering angular velocity is higher than the target steering angular velocity, the steering support ECU calculates a target steering angular velocity control torque acting in a direction opposite to a direction in which the steering angle changes, and controls the control steering torque generating device so as to generate a control steering torque including a sum of the target steering guide torque and the target steering angular velocity control torque.

11 Claims, 10 Drawing Sheets

(56)        References Cited

U.S. PATENT DOCUMENTS

| | | | | |
|---|---|---|---|---|
| 2019/0193776 | A1* | 6/2019 | Tsubaki | ............. B62D 15/0235 |
| 2019/0367082 | A1 | 12/2019 | Sugamoto et al. | |
| 2021/0163063 | A1* | 6/2021 | Shibata | ................ B62D 5/0463 |

FOREIGN PATENT DOCUMENTS

| | | | | | |
|---|---|---|---|---|---|
| CN | 105555643 | A | * | 5/2016 | ............... B62D 6/00 |
| CN | 105579325 | A | * | 5/2016 | ........... B62D 5/0466 |
| CN | 111315637 | A | * | 6/2020 | ........... B62D 5/0463 |
| CN | 111406011 | A | * | 7/2020 | ............. B62D 6/008 |
| DE | 112016002345 | B4 | * | 11/2021 | ........ B62D 15/0285 |
| EP | 2050653 | A1 | * | 4/2009 | ........... B62D 5/0472 |
| JP | 2017-52353 | A | | 3/2017 | |
| JP | 2019-156041 | A | | 9/2019 | |
| JP | 2019-209844 | A | | 12/2019 | |
| JP | 7544088 | B2 | * | 9/2024 | ........ B60W 30/0956 |
| KR | 102579300 | B1 | * | 9/2023 | ........... B60W 10/20 |
| WO | WO-2013076839 | A1 | * | 5/2013 | ........... B62D 5/0463 |
| WO | WO-2018088456 | A1 | * | 5/2018 | ............. B62D 6/007 |
| WO | WO-2025069171 | A1 | * | 4/2025 | ............... B62D 6/00 |

* cited by examiner

FIG. 2

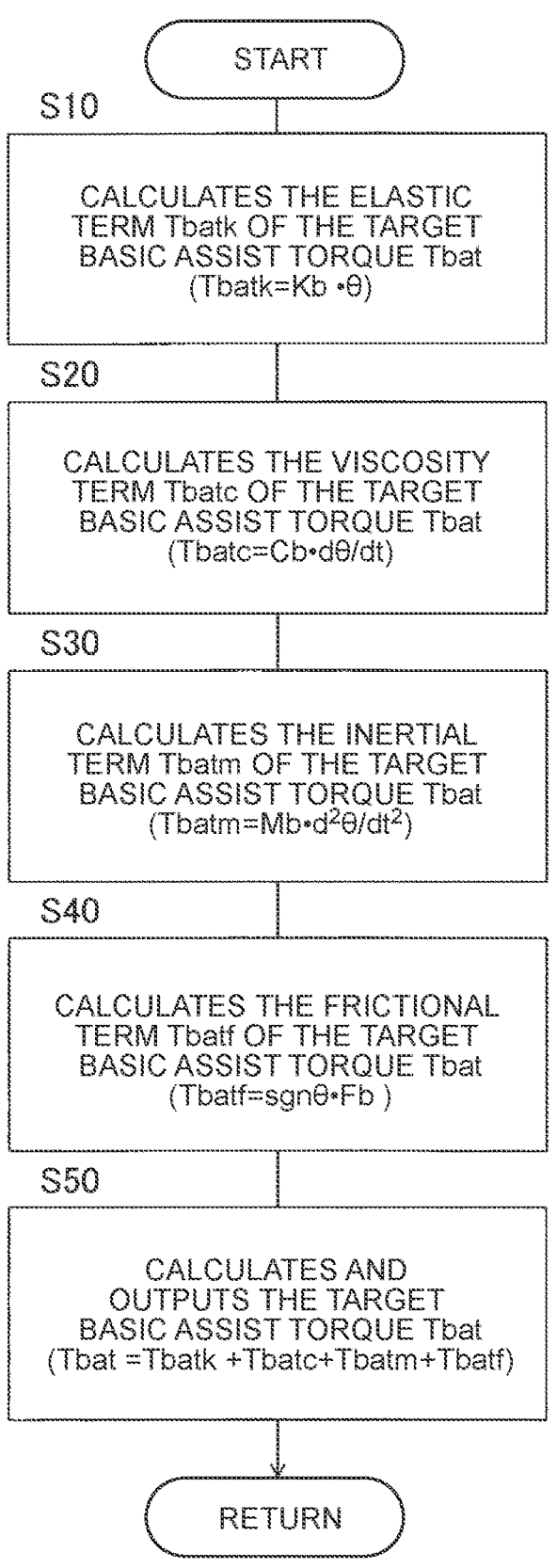

START

S10

CALCULATES THE ELASTIC
TERM Tbatk OF THE TARGET
BASIC ASSIST TORQUE Tbat
$(Tbatk = Kb \cdot \theta)$

S20

CALCULATES THE VISCOSITY
TERM Tbatc OF THE TARGET
BASIC ASSIST TORQUE Tbat
$(Tbatc = Cb \cdot d\theta/dt)$

S30

CALCULATES THE INERTIAL
TERM Tbatm OF THE TARGET
BASIC ASSIST TORQUE Tbat
$(Tbatm = Mb \cdot d^2\theta/dt^2)$

S40

CALCULATES THE FRICTIONAL
TERM Tbatf OF THE TARGET
BASIC ASSIST TORQUE Tbat
$(Tbatf = sgn\theta \cdot Fb)$

S50

CALCULATES AND
OUTPUTS THE TARGET
BASIC ASSIST TORQUE Tbat
$(Tbat = Tbatk + Tbatc + Tbatm + Tbatf)$

RETURN

FIG. 4

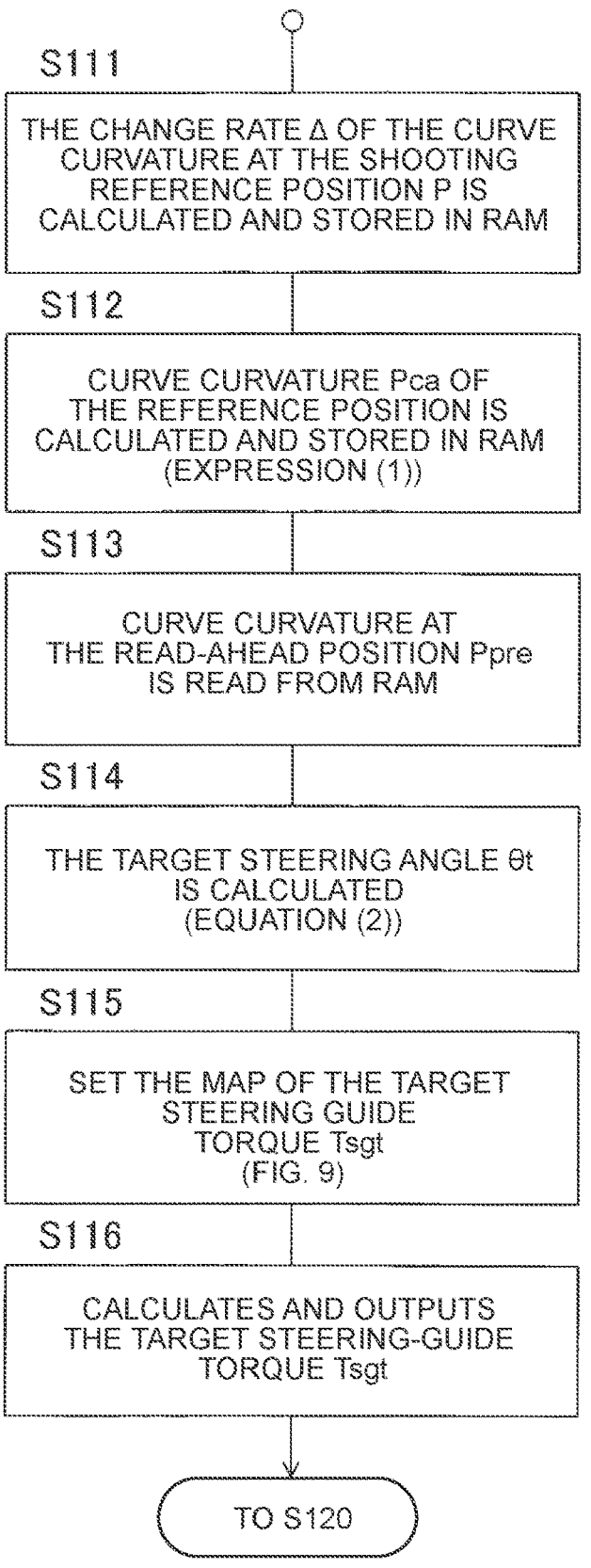

S111

THE CHANGE RATE Δ OF THE CURVE CURVATURE AT THE SHOOTING REFERENCE POSITION P IS CALCULATED AND STORED IN RAM

S112

CURVE CURVATURE Pca OF THE REFERENCE POSITION IS CALCULATED AND STORED IN RAM (EXPRESSION (1))

S113

CURVE CURVATURE AT THE READ-AHEAD POSITION Ppre IS READ FROM RAM

S114

THE TARGET STEERING ANGLE θt IS CALCULATED (EQUATION (2))

S115

SET THE MAP OF THE TARGET STEERING GUIDE TORQUE Tsgt (FIG. 9)

S116

CALCULATES AND OUTPUTS THE TARGET STEERING-GUIDE TORQUE Tsgt

TO S120

VEHICLE STEERING ASSIST DEVICE

CROSS-REFERENCE TO RELATED APPLICATION

This application claims priority to Japanese Patent Application No. 2022-075170 filed on Apr. 28, 2022, incorporated herein by reference in its entirety.

BACKGROUND

1. Technical Field

The present disclosure relates to a steering assist device for a vehicle such as an automobile.

2. Description of Related Art

As a steering assist device for a vehicle such as an automobile, there is known a steering assist device that prompts a driver to perform an optimum steering operation by determining an optimum steering angle for the vehicle to travel along a traveling road and controlling a steering reaction force so that the steering angle becomes an optimum steering angle.

For example, Japanese Unexamined Patent Application Publication No. 2019-209844 (JP 2019-209844 A) below describes a steering assist device configured to determine a target steering angle for a vehicle to travel along a traveling path, and to control a steering device so as to generate a steering guide torque for facilitating a steering angle to become the target steering angle.

When a steering input member such as a steering wheel is steered to a position other than a neutral position, a return torque for urging the steering input member to the neutral position is generated by the steering device. The steering guide torque corrects the return torque so that the magnitude of the return torque is reduced in a region where the magnitude of the steering angle is smaller than the magnitude of the target steering angle. In contrast, the steering guide torque corrects the return torque so that the magnitude of the return torque is increased in a region where the magnitude of the steering angle is larger than the magnitude of the target steering angle. The correction amount of the return torque increases as the magnitude of the difference between the steering angle and the target steering angle increases within a range in which the magnitude of the difference between the steering angle and the target steering angle is equal to or smaller than a predetermined reference value.

According to the steering assist device as described above, when a return steering is performed in a region in which the magnitude of the steering angle is smaller than the magnitude of the target steering angle, the return torque acting as the steering assist force is reduced by the steering guide torque and thus, it is difficult to perform the return steering such that the steering angle is far from the target steering angle. In addition, when an increase steering is performed in a region in which the magnitude of the steering angle is larger than the magnitude of the target steering angle, the return torque acting as the steering reaction force is increased by the steering guide torque and thus, it is difficult to perform the increase steering so that the steering angle is far from the target steering angle. Thus, since the steering of the driver can be urged so that the steering angle becomes the target steering angle, the steering assistance can be performed so that the steering amount of the driver becomes the optimum steering amount while the sense of independence of the steering of the driver can be maintained.

SUMMARY

In the steering assist device as described above, the returning torque is corrected so that the magnitude is reduced by the steering guide torque in a region where the magnitude of the steering angle is smaller than the magnitude of the target steering angle. Therefore, when the turning of the vehicle is started and the cut steering is performed, the steering reaction force when the magnitude of the steering angle increases becomes smaller than in the case where the return torque is not corrected by the steering guide torque and thus, the increase steering is easily performed. Therefore, depending on the driver, the steering force becomes excessive, and the steering speed at the initial stage of turning of the vehicle may become excessive.

The present disclosure provides a steering assist device that performs steering assistance so that a steering amount of a driver becomes an optimum steering amount while feeling of independence of steering of a driver is maintained, and that is improved in such a manner that a possibility that a steering speed at an initial stage of turning of a vehicle becomes excessive is reduced as compared with a conventional steering assist device.

According to the disclosure, a vehicle steering assist device (100) includes: a turning device (10) configured to turn a turning wheel in accordance with a steering operation amount ($\theta$) applied to a steering input member (steering wheel 14) by a driver, and configured to apply a return torque (Trea) for urging the steering input member to a neutral position to the steering input member, the return torque being a torque that increases as the steering operation amount increases; a control steering torque generating device (electric power steering (EPS) and electronic control unit (ECU)) 40, electric power steering device 12) that generates a control steering torque (Tsc) for correcting the return torque; a control unit (steering assist ECU 50) that controls the control steering torque generating device; a curvature degree acquisition device (camera sensor 52, navigation device 56, steering support ECU 50) that acquires a curvature degree of a traveling road in front of a vehicle (60); a vehicle speed detecting device (vehicle speed sensor 42); and a steering assist switch (54), in which when the steering assist switch is turned on, the control unit calculates a target steering angle ($\theta$t) for causing the vehicle to travel along a traveling road based on the curvature degree of the traveling road acquired by the curvature degree acquisition device and a vehicle speed (V) detected by the vehicle speed detecting device (S111 to S114), and in which the control unit calculates a target steering guide torque (Tsgt) for facilitating a steering angle ($\theta$) to become the target steering angle by reducing the return torque in an area where the steering angle is smaller than the target steering angle (S115, S116), in which the control unit is configured to control the control steering torque generating device to cause the control steering torque generating device to generate the control steering torque (Tsc) including the target steering guiding torque (S190).

The control unit (steering assistance ECU 50) calculates an actual steering angular velocity ($\theta$d) based on the steering angle ($\theta$) when the steering assist switch (54) is turned on (S120), calculates a target steering angular velocity ($\theta$td) based on the target steering angle ($\theta$t) (S120), in which when the actual steering angular velocity is higher than the target steering angular velocity (S130), the control unit calculates a target steering angular velocity control torque (Tavt) acting in a direction opposite to a direction in which the actual steering angle changes (S140), and in which the control unit is configured to control the control steering torque generating device to cause the control steering torque generating device to generate a control steering torque (Tsc) including a sum (Tsgt+Tavt) of the target steering guide torque and the target steering angular velocity control torque (S190).

According to the above configuration, when the steering assist switch is turned on, the control unit calculates a target steering angle for causing the vehicle to travel along a traveling road based on the curvature degree of the traveling road acquired by the curvature degree acquisition device and a vehicle speed detected by the vehicle speed detecting device. Further, the control unit calculates a target steering guide torque for facilitating the steering angle to become the target steering angle by reducing the return torque in an area where a steering angle is smaller than the target steering angle, and the control unit is configured to control the control steering torque generating device to cause the control steering torque generating device to generate the control steering torque including the target steering guiding torque.

Thus, when a return steering is performed in a region in which the magnitude of the steering angle is smaller than the magnitude of the target steering angle, the return torque acting as the steering assist force is reduced and thus, it is difficult to perform the return steering such that the steering angle is far from the target steering angle. Therefore, as compared with the case where the control steering torque including the target steering guide torque is not generated, since the steering of the driver is urged so that the steering angle becomes the target steering angle, the steering assistance can be performed so that the steering amount of the driver becomes the optimum steering amount while the sense of independence of the steering of the driver can be maintained.

Further, according to the above configuration, in a situation where the steering assist switch is turned on, the actual steering angular velocity is calculated based on the steering angle, and the target steering angular velocity is calculated based on the target steering angle. When the actual steering angular velocity is higher than the target steering angular velocity, the control unit calculates a target steering angular velocity control torque acting in a direction opposite to a direction in which the actual steering angle changes. Further, the control steering torque generating device is controlled to generate the control steering torque including the sum of the target steering guiding torque and the target steering angular velocity control torque.

Thus, when the actual steering angular velocity is higher than the target steering angular velocity, a steering angular velocity control torque corresponding to the target steering angular velocity control torque acts in a direction opposite to a direction in which the actual steering angle changes. Therefore, it is possible to suppress the magnitude of the actual steering angular velocity from becoming excessively large as compared with the case where the control steering torque does not include the target steering angular velocity control torque and thus, it is possible to reduce the possibility that the steering velocity at the initial stage of turning of the vehicle becomes excessive.

In one aspect of the present disclosure, the control unit (steering assistance ECU 50) is configured to calculate the target steering angular velocity control torque (Tavt) so as to increase the target steering angular velocity control torque (Tavt) as a difference ($\theta$d−$\theta$t) between the actual steering angular velocity and the target steering angular velocity increases.

According to the above aspect, the target steering angular velocity control torque that increases as the difference between the actual steering angular velocity and the target steering angular velocity increases is calculated. Therefore, in a situation where the difference between the actual steering angular velocity and the target steering angular velocity is small and a situation where the difference between the actual steering angular velocity and the target steering angular velocity is large, it is possible to decrease the possibility that the target steering angular velocity control torque becomes an excessively large value and the possibility that the target steering angular velocity control torque becomes an excessively small value. Therefore, it is possible to appropriately suppress the actual steering angular velocity from becoming excessively large as compared with, for example, a case where the target steering angular velocity control torque is not included.

In one aspect, the control unit (steering assistance ECU 50) is configured to: calculate a determination reference value ($\theta$dc) for a steering angular velocity based on a maximum steering angular velocity ($\theta$dmax) (S220 to S290) when the vehicle (60) travels on a curve of the traveling road, in a situation where the steering assist switch (54) is turned off (S210); reduce a magnitude of the target steering guide torque (Tsgt) (S180) when the actual steering angular velocity ($\theta$d) is smaller than the target steering angular velocity ($\theta$td) (S130) and an index value ($\theta$adin) of the actual steering angular velocity is higher than the determination reference value (S170), in a situation where the steering assist switch is turned on; and control the control steering torque generating device to cause the control steering torque generating device to generate a control steering torque that includes the target steering guide torque with a reduced magnitude of the target steering guide torque and that does not include the target steering angular velocity control torque (S190).

According to the above aspect, a determination reference value for a steering angular velocity is calculated based on a maximum steering angular velocity when the vehicle travels on a curve of a traveling road, in a situation where the steering assist switch is turned off. Therefore, it is possible to calculate the determination reference value for the steering angular velocity based on the maximum steering angular velocity when the vehicle travels on the curve of the traveling road in a state where the return torque is not reduced by the steering guide torque corresponding to the target steering guide torque.

In a situation where the steering assist switch is turned on, the return torque is reduced by the steering guide torque corresponding to the target steering guide torque. Therefore, it is considered that the reason why the index value of the actual steering angular velocity becomes larger than the determination reference value is that the return torque is reduced by the steering guide torque.

According to the above aspect, a magnitude of the target steering guide torque is reduced when the actual steering angular velocity is smaller than the target steering angular velocity and the index value of the actual steering angular velocity is higher than the determination reference value, in a situation where the steering assist switch is turned on. The amount by which the return torque is reduced by the steering guide torque corresponding to the target steering guide torque can be reduced. Therefore, since the degree by which the index value of the actual steering angular velocity is larger than the determination reference value can be reduced, compared to when the magnitude of the target steering guide torque is not reduced, it is possible to reduce the possibility that the steering velocity at the initial period of turning of the vehicle can be reduced.

In another aspect of the present disclosure, the control unit (steering assist ECU 50) is configured to: calculate a positive correction coefficient (α) smaller than 1 such that the correction coefficient becomes smaller as a magnitude of a difference (θadin−θdc) between the index value (θadin) of the actual steering angular velocity and the determination reference value (θdc) becomes larger (S180); and reduce the target steering guide torque by multiplying the target steering guide torque (Tsgt) by the correction coefficient (S180).

According to the above aspect, a positive correction coefficient smaller than 1 is calculated the correction coefficient becomes smaller as the magnitude of the difference between the index value of the actual steering angular velocity and the determination reference value becomes larger, and the target steering guide torque is reduced by multiplying the target steering guide torque by the correction coefficient. Therefore, as the difference between the index value of the actual steering angular velocity and the determination reference value increases, the reduction amount of the target steering guide torque can be increased. Thus, the amount by which the return torque is reduced by the steering guide torque corresponding to the target steering guide torque can be reduced, the larger the magnitude of the difference between the index value of the actual steering angular velocity and the determination reference value.

In another aspect of the disclosure, the control unit (steering assistance ECU 50) is configured to: calculate a determination reference value (θdc) for a steering angular velocity based on a maximum steering angular velocity (θdmax) when the vehicle (60) travels on a curve of the traveling road, in a situation where the steering assist switch (54) is turned off (S220 to S90); and control the control steering torque generating device to cause the control steering torque generating device to generate a control steering torque that includes the target steering guide torque with a reduced magnitude of the target steering guide torque and that does not include the target steering angular velocity control torque (S190), when the actual steering angular velocity (θd) is smaller than the target steering angular velocity (θtd) (S130) and an index value (θadin) of the actual steering angular velocity is not higher than the determination reference value (S170), in a situation where the steering assist switch is turned on.

According to the above aspect, a magnitude of the target steering guide torque is not reduced when the actual steering angular velocity is smaller than the target steering angular velocity and the index value of the actual steering angular velocity is not higher than the determination reference value, in a situation where the steering assist switch is turned on. Therefore, it is possible to effectively urge the steering of the driver so that the steering angle becomes the target steering angle, as compared with the case where the magnitude of the target steering guide torque is reduced.

In another aspect of the present disclosure, the index value (θadin) of the actual steering angular velocity is a half-dimensionless actual steering angular velocity (θd/0) obtained by dividing a current steering angular velocity (θd) by a current steering angle (θ) (S160).

According to the above aspect, the actual steering angular velocity is the half-dimensionless steering angular velocity obtained by dividing the current steering angular velocity by the current steering angle. As will be described later, the current steering angle and the current steering angular velocity are values that vary greatly depending on conditions such as the degree of curvature of the curve and the vehicle speed when the vehicle travels on the curve of the traveling road. On the other hand, the value obtained by dividing the current steering angular velocity by the current steering angle is a value having a small variation regardless of the current steering angle and the current steering angular velocity. Therefore, according to the half-dimensionless steering angular velocity, it is possible to obtain an index value for appropriately determining whether the actual steering angular velocity is excessive, regardless of the current steering angle and the current steering angular velocity.

In another aspect of the present disclosure, the determination reference value (θdc) is a value obtained based on a half-dimensionless maximum steering angular velocity (θdmax/θmax) obtained by dividing a maximum value (θdmax) of a magnitude of a steering angular velocity when the vehicle (60) travels on a curve of the traveling road in a state where the steering assist switch (54) is turned off by the maximum value (θmax) of the magnitude of the steering angle (S220 to S290).

According to the above aspect, the determination reference value is a value obtained based on a half-dimensionless maximum steering angular velocity obtained by dividing a maximum value of a magnitude of a steering angular velocity when the vehicle travels on a curve of a traveling road in a state where the steering assist switch is turned off by a maximum value of a magnitude of a steering angle. Therefore, according to the half-dimensionless maximum steering angular velocity, similar to the index value of the actual steering angular velocity, it is possible to obtain a determination reference value for properly determining whether the actual steering angular velocity is excessive, regardless of the maximum value of the magnitude of the steering angle and the maximum value of the magnitude of the steering angular velocity.

In another aspect of the disclosure, the control unit (steering assist ECU 50) is configured to calculate the determination reference value (S290) by calculating one of an average value of the half-dimensionless maximum steering angular velocity, a median of the half-dimensionless maximum steering angular velocity, a maximum value of the half-dimensionless maximum steering angular velocity, and a percentile value of the half-dimensionless maximum steering angular velocity, in a state in which the number (N) of the half-dimensionless maximum steering angular velocities (θdmax/θmax) is equal to or more than the number (Nc) of a reference (S280).

According to the above aspect, the determination reference value is calculated by calculating one of an average value of the half-dimensionless maximum steering angular velocity, a median of the half-dimensionless maximum steering angular velocity, a maximum value of the half-dimensionless maximum steering angular velocity, and a percentile value of the half-dimensionless maximum steering angular velocity, in a state in which the number of the half-dimensionless maximum steering angular velocity is equal to or more than the number of a reference. Therefore, the determination reference value can be calculated to an appropriate value as compared with a case where the determination reference value is calculated based on the half-dimensionless maximum steering angular velocity that is less than the reference number.

In the present application, "half-dimensionalized" means that the dimension is reduced by eliminating the unit of the angle, although it is not a perfect dimensionalization.

In the above description, in order to help understanding of the present disclosure, the names and/or the reference signs used in the embodiment are added in parentheses to the configurations of the disclosure corresponding to the embodiment to be described later. However, each component of the present disclosure is not limited to the component of the embodiment corresponding to the name and/or the symbol attached in parentheses. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flow chart illustrating an operation routine of the target basic assist torque Tbat according to the embodiment;

FIG. 4 is a flow chart illustrating a sub-routine of a target steering guide torque Tsgt operation performed in the step S10 of FIG. 2;

FIG. 8 is a diagram for explaining an imaging reference position and the like;

DETAILED DESCRIPTION OF EMBODIMENTS

Embodiments

Embodiments of the present disclosure will now be described in detail with reference to the accompanying drawings.

Figure 1:
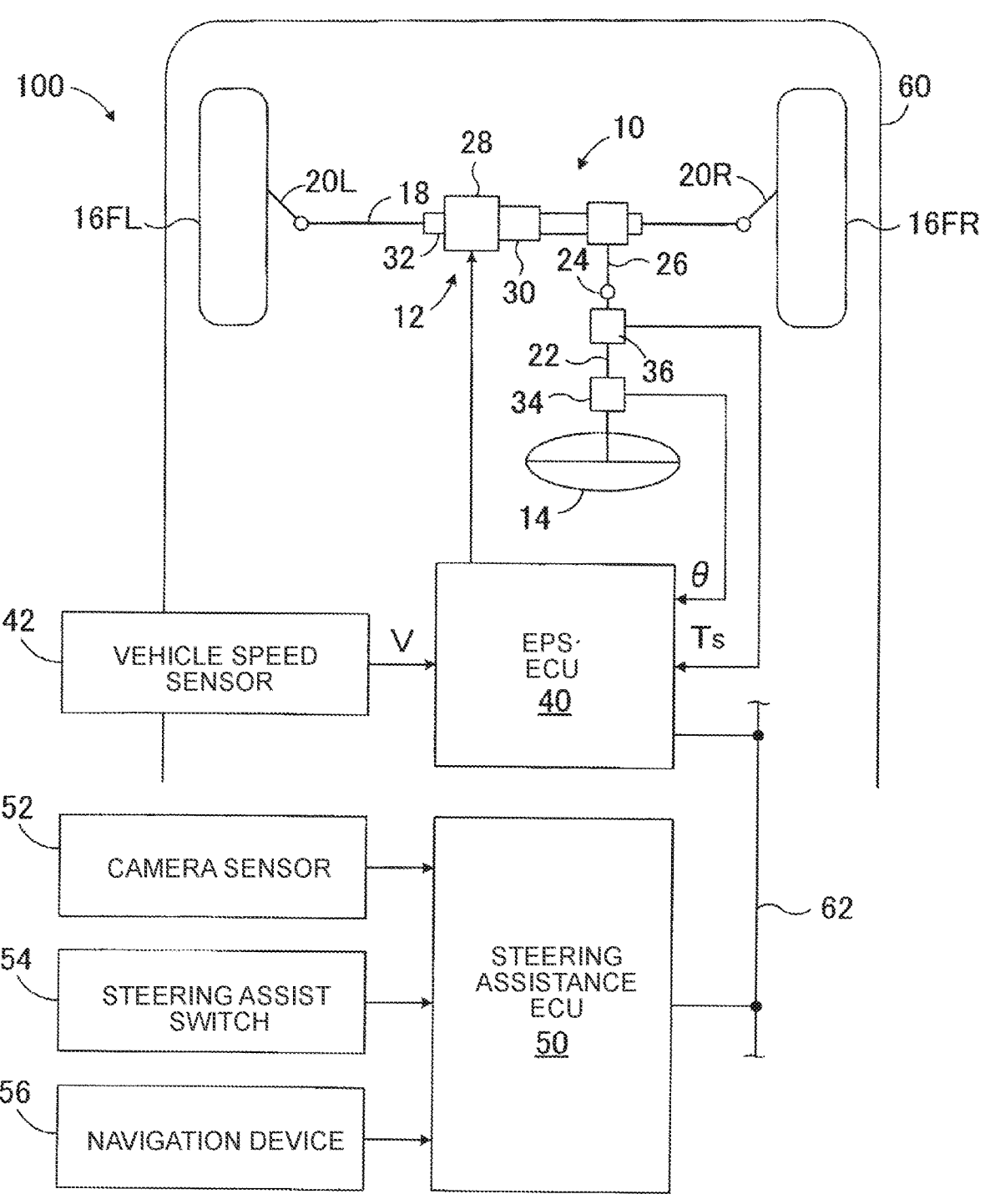
FIG. 1 is a schematic configuration diagram showing an embodiment of a steering assist device according to the present disclosure.

As shown in FIG. 1, the steering assist device 100 according to the embodiment is applied to a vehicle 60 including a steering device 10, an electric power steering ECU 40, and a steering assistance ECU 50. In this specification, the electric power steering is referred to as a EPS as needed.

The electric power steering ECU 40 and the steering assistance ECU 50 are electronic control units including a microcomputer as a main part, and are connected to each other via a CAN Controller Area Network 62 so as to be able to transmit and receive data. Each of the microcomputers includes a central processing unit (CPU), a read-only memory (ROM), a random access memory (RAM), a non-volatile memory, and an interface (I/F), and the like. The CPU realizes various functions by executing instructions (programs, routines) stored in the ROM. These ECU may be integrated into one ECU.

As shown in FIG. 1, the steering device 10 includes an EPS device 12. The EPS device 12 is configured as a rack and pinion type electric power steering device driven in response to an operation of a steering wheel 14 by the driver. The rack bar 18 of the EPS device 12 to connected to knuckle arms (not shown) of front wheels 16FR, 16FL via tie rods 20R, 20L. The steering wheel 14 is connected to a pinion shaft 26 of the EPS device 12 via a steering shaft 22 and a universal joint 24.

When the vehicle 60 turns, a self-aligning torque acts on the front wheels 16FL and 16FR which are steered wheels, and the self-aligning torque is transmitted to the steering wheel 14 via the steering device 10. Therefore, the steering wheel 14, a return torque Tre (return torque when the basic assist torque Tba to be described later is not generated) for energizing it to the neutral position, that is, the straight driving position of the vehicle acts. The self-aligning torque increases as the turning angle of the front wheel increases and increases as the vehicle speed V increases.

Figure 6:
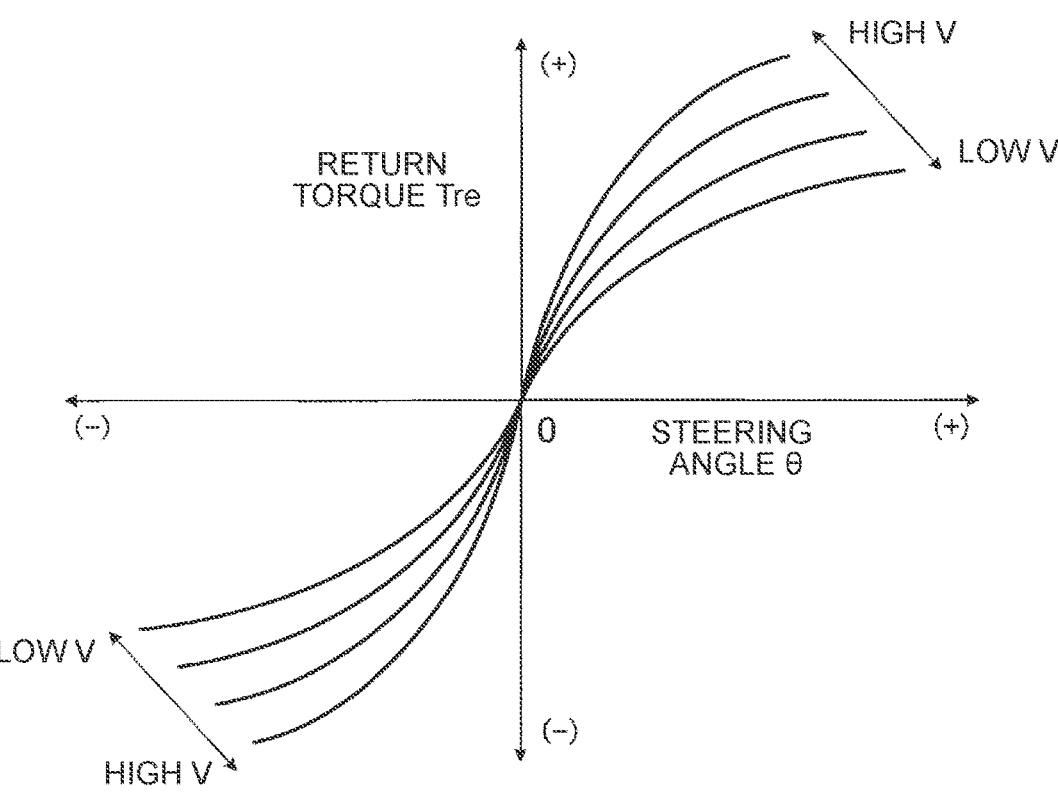
FIG. 6 is a diagram illustrating a relation between the steering angle θ and the vehicle speed V and the return torque Tre.

Assuming that the steering angle θ, which is the rotational angle of the steering wheel 14, becomes positive when the vehicle 60 turns to the right, and the return torque Tre becomes positive when acting in the counterclockwise direction, as shown in FIG. 6, the magnitude of the return torque Tre increases as the absolute value of the steering angle θ increases. The rate of increase of the return torque Tre decreases as the absolute value of the steering angle θ increases. Further, the magnitude of the return torque Tre increases as a vehicle speed V increases.

Figure 7:
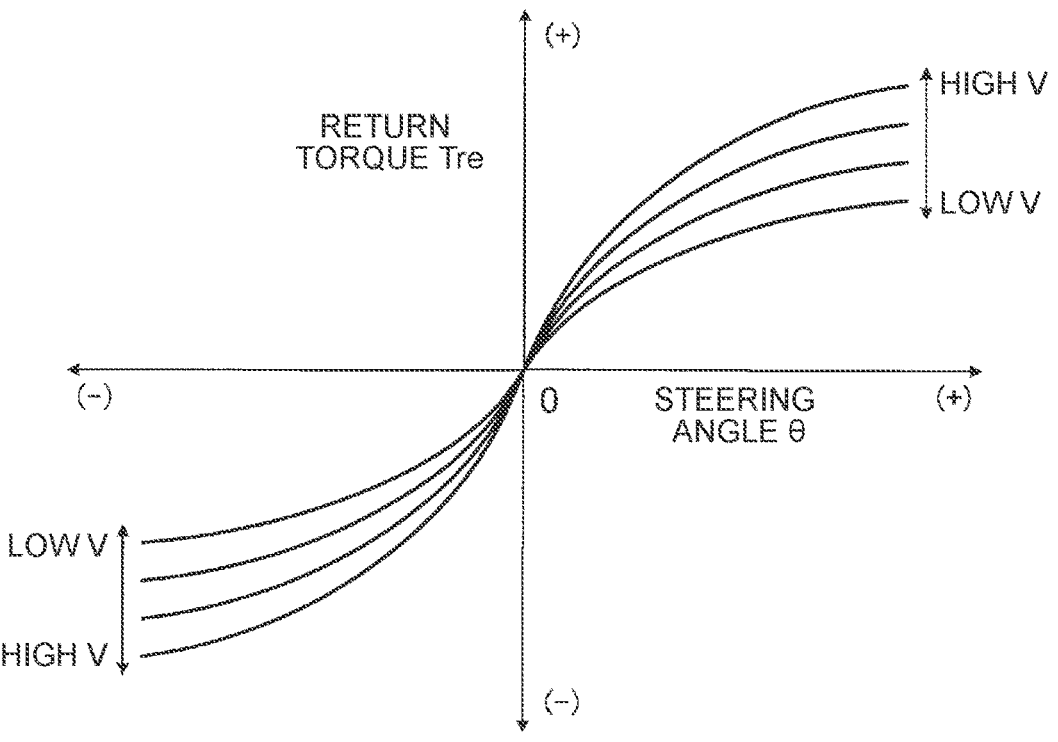
FIG. 7 is a diagram illustrating a relation between the steering angle θ and the vehicle speed V and the return torque Trea.

In the illustrated embodiment, the EPS device 12 is a rack coaxial type electric power steering device, and includes an electric motor 28 and a ball screw type conversion mechanism 30 that converts a rotational torque of the electric motor 28 into a force in the reciprocating direction of the rack bar 18, for example. EPS device 12 generates a basic assist torque Tba by driving the rack bar 18 relative to the housings 32. Therefore, the magnitude of the return torque Trea when the basic assist torque Tba is generated is smaller than the magnitude of the return torque Tre as shown in FIG. 7.

EPS device 12 functions as a control steering torque generating device that generates a control steering torque Tsc that corrects the return torque Trea. As will be described further below, the control steering torque Tsc includes a target steering guide torque Tsgt, and the magnitude of the target steering guide torque Tsgt is about one tenth of the magnitude of the return torque Trea. The steering guide torque Tsg corresponding to the target steering guide torque Tsgt acts as a torque for promoting the steering of the driver such that the actual steering angle θ becomes the target steering angle θt, that is, the target steering angle for causing the vehicle 60 to travel along the traveling path.

The steering guide torque Tsg acts to suppress the steering when the driver increases the steering so that the actual steering angle θ is away from the target steering angle θt. In addition, the steering guide torque Tsg acts so that the driver performs a switchback steering so that the actual steering angle θ is away from the target steering angle θt.

The steering assist ECU 50 calculates a target basic assist torque Tbat which is a target value of the basic assist torque Tba and a target steering guide torque Tsgt which is a target value of the steering guide torque Tsg. Further, the steering assistance ECU 50 calculates a target steering angular velocity control torque Tavt for suppressing the steering angular velocity θd from becoming excessively large. The calculated target basic assist torque Tbat, target steering guide torque Tsgt, and target steering angular velocity control torque Tavt are supplied to EPS device 12. The calculation of the target basic assist torque Tbat, the target steering guide torque Tsgt, and the target steering angular velocity control torque Tavt will be described later.

Further, when the driver steers, the EPS device 12 generates the steering assist torque Tsa based on a steering torque Ts and the vehicle speed V as necessary so as to reduce a steering burden on the driver. EPS·ECU 40 receives a signal indicating the vehicle speed V detected by the vehicle speed sensor 41. EPS·ECU 40 controls EPS device 12 so that the control steering torque Tsc generated by EPS device 12 becomes the sum Tbat+Tsgt+Tavt+Tsa of the target basic assist torque Tbat, the target steering guide torque Tsgt, the target steering angular velocity control torque Tavt, and the steering assist torque Tsa.

As will be described later, when the steering assist switch 54 is off, the target steering guiding torque Tsgt and the target steering angular velocity control torque Tavt are not calculated. Therefore, EPS·ECU 40 controls EPS device 12 so that the control steering torque Tsc generated by EPS device 12 becomes the sum Tbat+Tsa of the target basic assist torque and the steering assist torque Tsa.

Further, EPS device 10 may be of any configuration known in the art so long as it is capable of generating a control steering torque Tsc that is the sum of the target basic assist torque Tbat, the target steering guide torque Tsgt, the target steering angular velocity control torque Tavt, and the steering assist torque Tsa. For example, the EPS device 12 may be a rack-assisted type or column-assisted type electric power steering device that is not a rack coaxial type.

The steering shaft 22 is provided with a steering angle sensor 34 that detects the steering angle θ, that is, the rotation angle of the steering shaft 22, and a steering torque sensor 36 that detects the steering torque Ts. A signal indicating the steering angle θ detected by the steering angle sensor 34 and a signal indicating the steering torque Ts detected by the steering torque sensor 36 are also inputted to EPS·ECU 40. The steering angle sensor 34 and the steering torque sensor 36 detect the steering angle θ and the steering torque Ts, respectively, with the values detected when the vehicle 60 turns to the right being positive.

As shown in FIG. 1, a camera sensor 52, a steering assist switch 54, and a navigation device 56 are connected to the steering assist ECU 50. At least a part of the vehicle speed sensor 42, the camera sensor 52, and the like may be connected to another ECU such as a CAN62 or a EPS·ECU 40.

The camera sensor 52 includes a camera unit that captures a scene in front of the vehicle 60, and a recognition unit that analyzes image data obtained by capturing an image by the camera unit and recognizes a white line (lane boundary) or an obstacle of a road. The recognition unit of the camera sensor 52 repeatedly supplies the recognized white line and the recognized obstacle to the steering support ECU 50 at a predetermined calculation cycle.

The steering assist switch 54 is operated by the driver and supplies a signal to the steering assistance ECU 50 indicating whether or not the vehicle is on. When the steering assist switch 54 is on, the steering assist ECU 50 calculates a target steering angle θt for driving the vehicle 60 along the traveling path as described later, and calculates a target steering guide torque Tsgt for guiding the steering of the driver so that the actual steering angle θ becomes the target steering angle θt.

The navigation device 56 includes a GPS receiver that detects the position of the vehicle 60, a storage device that stores the map information and the road information, and a communication device that acquires the latest information of the map information and the road information from the outside. The navigation device 56 outputs the road information to the steering assistance ECU 50 in addition to the information such as the position and the heading of vehicle on the map.

Calculation of Target Steering Angle θt

In the embodiment, the steering assistance ECU 50 calculates the target steering angle θt for causing the vehicles 60 to travel along the traveling path as follows.

Figure 8:
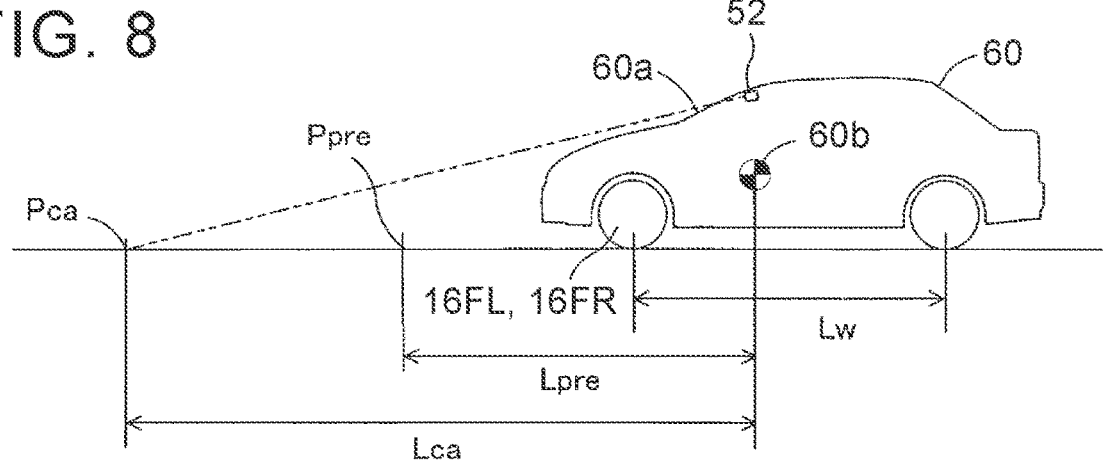

As illustrated in FIG. 8, the camera sensor 52 is fixed to an upper portion of an inner surface of the windshield 60a of the vehicle 60, and captures an image in front of the vehicle 60 around a imaging reference position Pca of a distance Lca (positive constant) from a center of gravity 60b that is a reference position of the vehicle 60 to the front. The distance Lca is called an imaging reference distance Lca as necessary. The reference position of the vehicle 60 may be the positions of the front wheels 16FR, 16FL, the intermediate positions of the front and rear wheels, and the like.

The steering assistance ECU 50 calculates the curve curvature pca of the traveling road with respect to the area centered on the imaging reference position Pca based on the white line data of the lane ahead of the vehicle 60 acquired by the camera sensor 52, and stores the calculated curve curvature pca in RAM. Therefore, the camera sensor 52 and the steering assistance ECU 50 function as a curvature degree acquisition device that acquires the curve curvature pca of the traveling path as a curvature degree in an area centered on the imaging reference position Pca.

Further, the steering assistance ECU 50 reads the curve curvature pca corresponding to the read-ahead time Δt from RAM as the curve curvature ppre of the read-ahead, calculates the target steering angle $\theta t$ based on the curve curvature ppre, and calculates the target steering guide torque Tsgt based on the deviation $\Delta\theta(\theta-\theta t)$ between the target steering angle $\theta t$ and the actual steering angle $\theta$. The target steering angle $\theta t$ is a target steering angle for making it easy for the actual steering angle to stay within a range suitable for causing the vehicle 60 to travel along the curve. In the embodiment, the curvature in the direction in which the vehicle 60 turns to the right is positive.

The curve curvature pca (1/m) is calculated in accordance with the following equation (1). In the following equation (1), V is the vehicle speed (m/s), and $\rho_0$ is the curve curvature (1/m) of the traveling path at the center of gravity 60b of the vehicle 60. Thus, $\rho_0$ is the curve curvature pca calculated and stored in RAM prior to the time Lca/V required for the vehicles 60 to travel the imaging reference distance Lca shown in FIG. 8. $\Delta\rho$ is a rate of change (1/m/m) of the curve curvature pca calculated before the time Lca/V and stored in the RAM, that is, a change amount of the curve curvature per unit distance.

$$\rho ca=\rho_0+V\Delta t\Delta\rho \qquad (1)$$

As shown in FIG. 8, a distance (read-ahead distance) Lpre between the center of gravity 60b and the read-ahead position Ppre of the vehicles 60 is smaller than the imaging reference distance Lca. Note that, the look-ahead distance Lpre does not have to be constant. As can be understood from the above description, the curve curvature ppre is the curve curvature at the look-ahead position Ppre, that is, the curve curvature at the position where the center of gravity 60b of the vehicle 60 reaches after the look-ahead time $\Delta t$.

The target steering angle $\theta t$ (deg) is calculated in accordance with the following equation (2). In the following equation (2), Rst is a steering gear ratio of the steering device 10, A is the stability factor of the vehicle 60 (deg/ (m²/s²)), and Lw is a wheelbase of the vehicle 60. The steering gear ratio Rst, the stability factor A, and the wheelbase Lw are known constant values determined by the specifications of the vehicle 60.

$$\theta t=Rst(1+AV^2)\rho pre Lw \qquad (2)$$

Calculation of Target Basic Assist Torque Tbat

Next, an operation routine of the target basic assist torque Tbat according to the embodiment will be described referring to the flow chart shown in FIG. 2. Note that the calculation control of the target basic assist torque Tbat according to the flow chart shown in FIG. 2 is repeatedly executed at predetermined intervals by CPU of the steering assist ECU 50 when the ignition switch not shown in the drawing is on.

First, in the step S10, CPU calculates the elastic term Tbatk of the target basic assist torque Tbat as the product Kb·$\theta$ of the steering angle $\theta$ and the elastic modulus Kb (positive constant).

In the step S20, CPU calculates the first-order differential value d$\theta$/dt of the steering angle $\theta$, and calculates the viscosity term Tbatc of the target basic assist torque Tbat as the product Cb·d$\theta$/dt of the first-order differential value d$\theta$/dt and the viscosity coefficient Cb (positive constant). The first-order differential d$\theta$/dt of the steering angle $\theta$ is expressed as a steering angular velocity $\theta d$ as needed.

In the step S30, CPU calculates the second derivative value d²$\theta$/dt² of the steering angle $\theta$, and calculates the inertial term Tbatm of the target basic assist torque Tbat as the product Mb·d²$\theta$/dt² of the second derivative value d²$\theta$/dt² and the inertial coefficient Mb (positive constant).

In S40 of steps, CPU calculates the friction term Tbatf of the target basic assist torque Tbat using the sign of the steering angle $\theta$ as sgn$\theta$ and the product sgn$\theta$ of the friction control quantity Fb (positive constant) as sgn$\theta$·Fb.

In S50 of steps, CPU calculates, as a sum Tbatk+Tbatc+Tbatm+Tbatf of the elastic term Tbatk, the viscous term Tbatc, the inertial term Tbatm, and the frictional term Tbatf, a target basic assist torque Tbat, and outputs a signal indicating the target basic assist torque Tbat to EPS·ECU 40. Note that any one of the viscosity term Tbatc, the inertial term Tbatm, and the frictional term Tbatf may be omitted. Calculation of Target Steering Guide Torque Tsgt and Target Steering Angular Velocity Control Torque Tavt Referring to the flow charts shown in FIGS. 3 and 4, a target steering guide torque Tsgt and a calculation control routine of the target steering angular velocity control torque Tavt according to the embodiment will be described. In the following explanation, the calculation control of the target steering guide torque Tsgt and the target steering angular velocity control torque Tavt according to the flow chart shown in FIG. 3 will be simply referred to as the present control.

Figure 3:
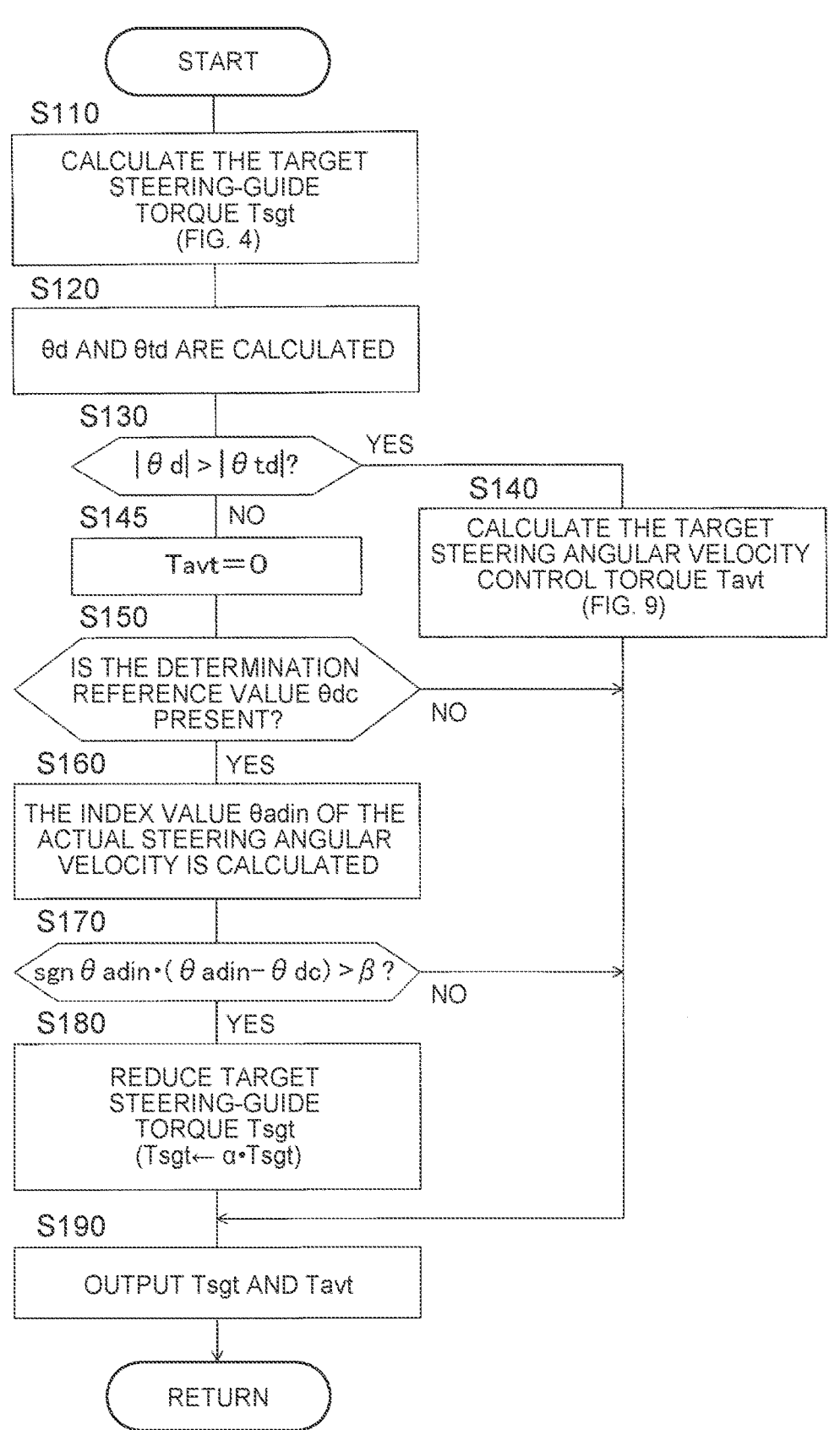
FIG. 3 is a flow chart illustrating an operation control routine of the target steering guide torque Tsgt and the target steering angular velocity control torque Tavt according to the embodiment.

Incidentally, the calculation control according to the flow chart shown in FIG. 3, when the ignition switch and the steering assist switch 54 which are not shown in the drawing are on, for the time of the turning-on steering and the turning-back steering, the operation control is repeatedly executed at predetermined time intervals by CPU of the steering assist ECU 50 individually.

First, in the step S110, CPU calculates the target steering guide torque Tsgt according to the sub-routine shown in FIG. 4.

In the step S120, CPU calculates the steering angular velocity $\theta d$ as the time differential value of the steering angle $\theta$, and calculates the target steering angular velocity $\theta td$ as the time differential value of the target steering angle $\theta t$. The target steering angular velocity $\theta td$ is expressed as: The calculation may be performed according to an equation obtained by differentiating the above equation (2).

In the step S130, CPU determines whether or not the absolute value of the steering angular velocity $\theta d$ is larger than the absolute value of the target steering angular velocity $\theta td$, that is, whether or not the actual steering angular velocity is higher than the target steering angular velocity. When a negative determination is made, CPU sets the target steering angular velocity control torque Tavt for suppressing excessive steering angular velocity $\theta d$ to 0 in step S145, and when an affirmative determination is made, the control proceeds to step S140.

Figure 9:
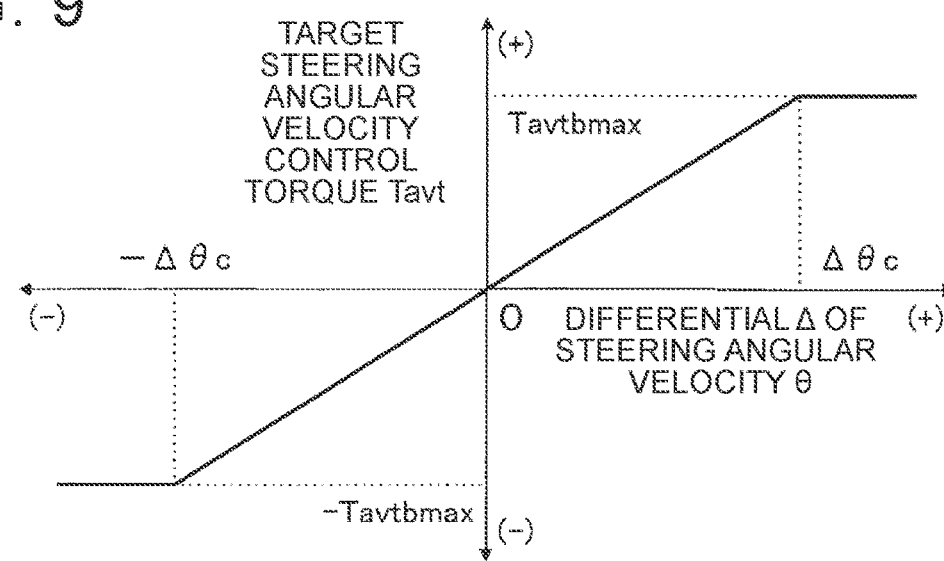
FIG. 9 is a map showing the relation between the deviation Δθ of the steering angle and the target basic steering guide torque Tsgtb.

In the step S140, CPU calculates the target steering angular velocity control torque Tavt by referring to the map shown in FIG. 9 on the basis of the difference $\Delta\theta d$ (=$\theta d-\theta td$) between the steering angular velocity $\theta d$ and the target steering angular velocity $\theta td$. The target steering angular velocity control torque Tavt generates a torque acting to suppress an increase in the magnitude of the steering angular velocity $\theta d$, that is, a torque acting in a direction opposite to the direction in which the actual steering angle changes.

As shown in FIG. 9, when the difference $\Delta\theta d$ between the steering angular velocity $\theta d$ and the target steering angular velocity $\theta td$ is greater than $-\Delta\theta dc$ and less than $\Delta\theta dc$, the magnitude of the target steering angular velocity control torque Tavt increases as the difference $\Delta\theta d$ increases. Therefore, the target steering angular velocity control torque Tavt is calculated so that the larger the difference Md is, the larger the magnitude becomes. Further, the target steering angular velocity control torque Tavt becomes a constant value of −Tavtmax when the difference Δθd is equal to or less than −Δθdc, and becomes a constant value of Tavtmax when the difference Δθd is equal to or greater than Δθdc.

In S150 of steps, CPU determines whether or not the determination reference value θdc is present, that is, whether or not the determination reference value θdc is stored in the non-volatile memory. When a negative determination is made, CPU advances the present control to step S190, and when an affirmative determination is made, the control advances to step S160. The determination reference value θdc is calculated in accordance with the flowchart illustrated in FIG. 5 as described later.

In the step S160, CPU calculates the current steering angular velocity θd as the time-differential value of the current steering angle θ, and divides the current steering angular velocity θd by the current steering angle θ, thereby calculating the index value θadin of the actual steering angular velocity as the half-dimensionless steering angular velocity.

In the step S170, CPU determines whether or not the product sgnθadin·(θadin−θdc) of the sign sgnθadin of the steering angle θadin and the difference θadin−θdc between the index value θadin of the steering angular velocity and the determination reference value θdc is larger than the reference value β, that is, whether or not the possibility that the steering angular velocity becomes excessive needs to be reduced. When a negative determination is made, CPU advances the present control to step S190, and when an affirmative determination is made, the control advances to step S180. The reference value β may be 0 or a positive constant.

In S180 of steps, CPU reduces the target steering guide torque Tsgt to α·Tsgt with α being a positive correction coefficient less than 1. Note that the correction coefficient α decreases as the magnitude of the difference Δθadin (=θadin−θdc) between the index value θadin of the steering angular velocity and the determination reference value θdc increases, for example, 1−|Δθadin| It may be computed as.

In the step S190, CPU outputs a signal indicating the target steering guiding torque Tsgt and a signal indicating the target steering angular velocity control torque Tavt to EPS·ECU 40.

As illustrated in FIG. 4, in the step S111, CPU calculates a change rate Δρ of the curve curvature for an area centered on the imaging reference position Pca on the basis of the white line data of the lane ahead of the vehicle 60 acquired by the camera sensor 52, and stores the calculated change rate Δρ in RAM.

In the step-wise S112, the curve curvature pca of the traveling path is calculated for an area centered on the imaging reference position Pca in accordance with the above-described Expression (1), and is stored in RAM. Note that the curve curvature pca may be set to 0 during the period from the beginning of the present control until the elapse of the temporal Lca/V.

In S113 of steps, CPU reads the curve curvature pca calculated prior to the read-ahead time Δt and stored in RAM from RAM as the curve curvature ppre at the read-ahead position Ppre.

In the step S114, CPU calculates, based on the vehicle speed V and the curve curvature ppre at the read-ahead position Ppre, the target steering angle θt as the target steering manipulated variable for the vehicle 60 to travel along the curve of the traveling road according to the above equation (2).

Figure 10:
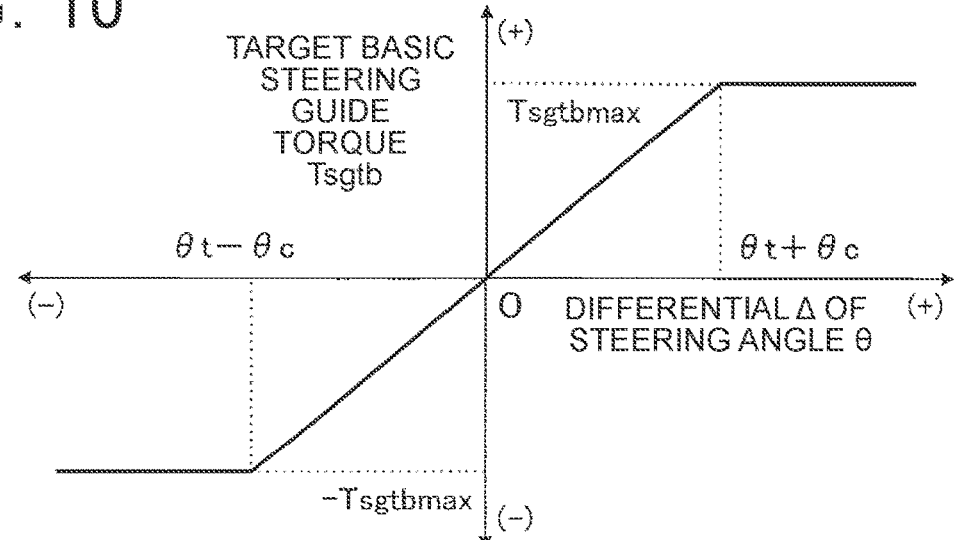
FIG. 10 is a diagram illustrating a relation between a steering angle θ, a return torque Trea (solid line), and a target steering guide torque Tsgt (dashed-dotted line) for an area where the steering angle θ is positive.

In S115 of steps, as shown in FIG. 10, CPU determines a map of the target steering guide torque Tsgt such that the target basic steering guide torque Tsgtb becomes 0 when the steering angle θ is the target steering angle θt. As described above, when the deviation Δθ (=θ−θt) between the steering angle θ and the target steering angle θt is greater than θt−θc and less than θt+θc, the magnitude of the target steering guide torque Tsgt increases as the deviation Δθ of the steering angle increases. Further, the target steering guide torque Tsgt becomes a constant value of −Tsgtbmax when the deviation Δθ of the steering angle is equal to or less than θt−θc, and becomes a constant value of Tsgtbmax when the deviation Δθ of the steering angle is equal to or greater than θt+θc.

In the step S116, CPU calculates the target steering guide torque Tsgt by referring to the map determined in the step S115 based on the deviation Δθ of the steering angle, which is the deviation θ−θt between the steering angle θ and the target steering angle θt. Further, CPU outputs a signal indicating the target steering guide torque Tsgt to EPS·ECU 40.

Figure 11:
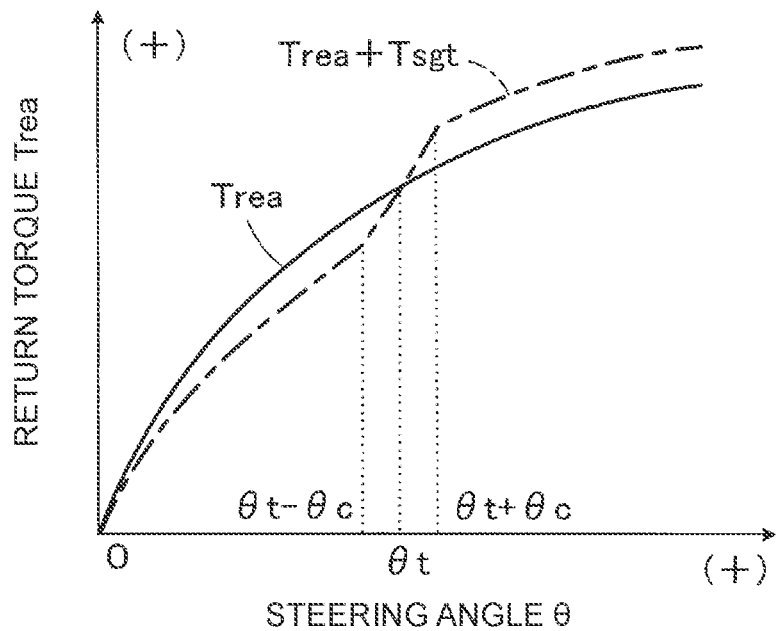
FIG. 11 is a diagram illustrating an example of a relationship between an actual steering angle θ and an actual large angular velocity θd when a vehicle travels on curves of various curvatures at various vehicle speeds when the steering angle θ is positive.

FIG. 11 shows the return torque for the area where the steering angle θ is positive, and the solid and dashed-dotted lines show the return torque Treag, i.e., Trea+Tsgt, corrected by the return torque Trea and the target steering guiding torque Tsgt, respectively. The line of the return torque in the region where the steering angle θ is negative is a line that is point-symmetrical with respect to the line of the return torque in the region where the steering angle θ is positive with respect to the origin.

As can be seen from FIG. 10, the target steering guide torque Tsgt corrects the return torque so that the magnitude of the return torque Trea is reduced in an area where the magnitude of the steering angle θ is smaller than the magnitude of the target steering angle θt. Conversely, the target steering guide torque Tsgt corrects the return torque so that the magnitude of the return torque Trea is increased in an area where the magnitude of the steering angle θ is larger than the magnitude of the target steering angle θt. The correction amount of the return torque Trea increases as the magnitude of the difference θ−θt between the steering angle and the target steering angle increases within a range in which the magnitude of the difference between the steering angle and the target steering angle is equal to or smaller than a predetermined reference value.

Calculation of the Determination Reference Value θDc

Next, an operation control routine of the determination reference value θdc according to the embodiment will be described with reference to the flowchart shown in FIG. 5. Incidentally, the calculation control of the determination reference value θdc by the flow chart shown in FIG. 5, when the ignition switch not shown in the drawing is on, for the turning-on steering time and the switching-back steering time individually, by CPU of the steering assist ECU 50 is repeatedly executed at predetermined time intervals.

First, in S210 of steps, CPU determines whether or not the steering assist switch 54 is off. CPU ends the calculation control of the determination reference value once when a negative determination is made, and advances the calculation control of the determination reference value to S220 of steps when an affirmative determination is made.

In S220 of steps, CPU determines whether or not the vehicle is turning by determining whether or not the turning determination condition of the vehicle 60 is satisfied. When a negative determination is made, CPU advances the calculation control of the determination reference value to step S240, and when an affirmative determination is made, advances the calculation control of the determination reference value to step S230. In this case, the turning determination condition may be that the absolute value of the steering angle θ is equal to or greater than the reference value θc (positive constant) and/or that the absolute value of the yaw rate γ of the vehicle 60 is equal to or greater than the reference value γc (positive constant).

In the step S230, CPU calculates a steering angular velocity θd, which is a time-differential value of the steering angle θ, and stores the steering angle θ and the steering angular velocity θd in RAM.

In S240 of steps, CPU determines whether or not the turning of the vehicle is completed by determining whether or not the turning-end determination condition of the vehicle 60 is satisfied. CPU ends the calculation control of the determination reference value once when a negative determination is made, and advances the calculation control of the determination reference value to S250 of steps when an affirmative determination is made. In this case, the turning end determination condition may be that the absolute value of the steering angle θ is equal to or less than the reference value θe (a positive constant equal to or less than θc) and/or that the absolute value of the yaw rate γ of the vehicle 60 is equal to or less than the reference value γe (a positive constant equal to or less than γc).

In the step S250, CPU extracts the maximum value θmax of the steering angular velocity having the largest absolute value among the steering angles θ stored in RAM and the maximum value θdmax of the steering angular velocity having the largest absolute value among the steering angular velocities θd stored in RAM. Note that CPU eliminates the steering angle θ and the steering angular velocity θd stored in RAM when the maximal value θdmax of the steering angular velocity is extracted.

In the step S260, CPU calculates the index value θdin of the steering angular velocity as the absolute value of the half-dimensionless value θdmax/θmax obtained by dividing the maximum value θdmax of the steering angular velocity by the maximum value θmax of the steering angle. θmax used for calculation of the index value θdin of the steering angular velocity is the maximum value of the steering angle having the largest absolute value among the steering angles θ stored in RAM, but may be the steering angle θ when the absolute value of the steering angular velocity θd becomes the maximum value θdmax.

In S270 of steps, CPU stores the index θdin of the steering angular velocity in a rewritable non-volatile memory.

In the step S280, CPU determines whether or not the number N of index values θdin of the steering angular velocity stored in the nonvolatile memory is equal to or greater than a reference value Nc (for example, a positive constant integer such as 3). CPU ends the calculation control of the determination reference value once when a negative determination is made, and advances the calculation control of the determination reference value to S290 of steps when an affirmative determination is made.

In S290 of steps, CPU calculates the determination reference value θdc based on the index value θdin of the N steering angular velocities stored in the nonvolatile memory, and stores the calculated determination reference value θdc in the rewritable nonvolatile memory. In this case, the determination reference value θdc may be either the average value of the index value θdin for N steering angle, the median value of the index value θdin for N steering angular velocity, the maximum value of the index value θdin for N steering angular velocity, or, for example, 99% ile of the index value θdin for N steering angular velocity.

When the preset update condition is satisfied, for example, the oldest θdin or all θdin may be erased each time the vehicle is stopped while the total travel distance of the vehicle 60 travels by the reference distance or more, thereby updating θdc.

Figure 5:
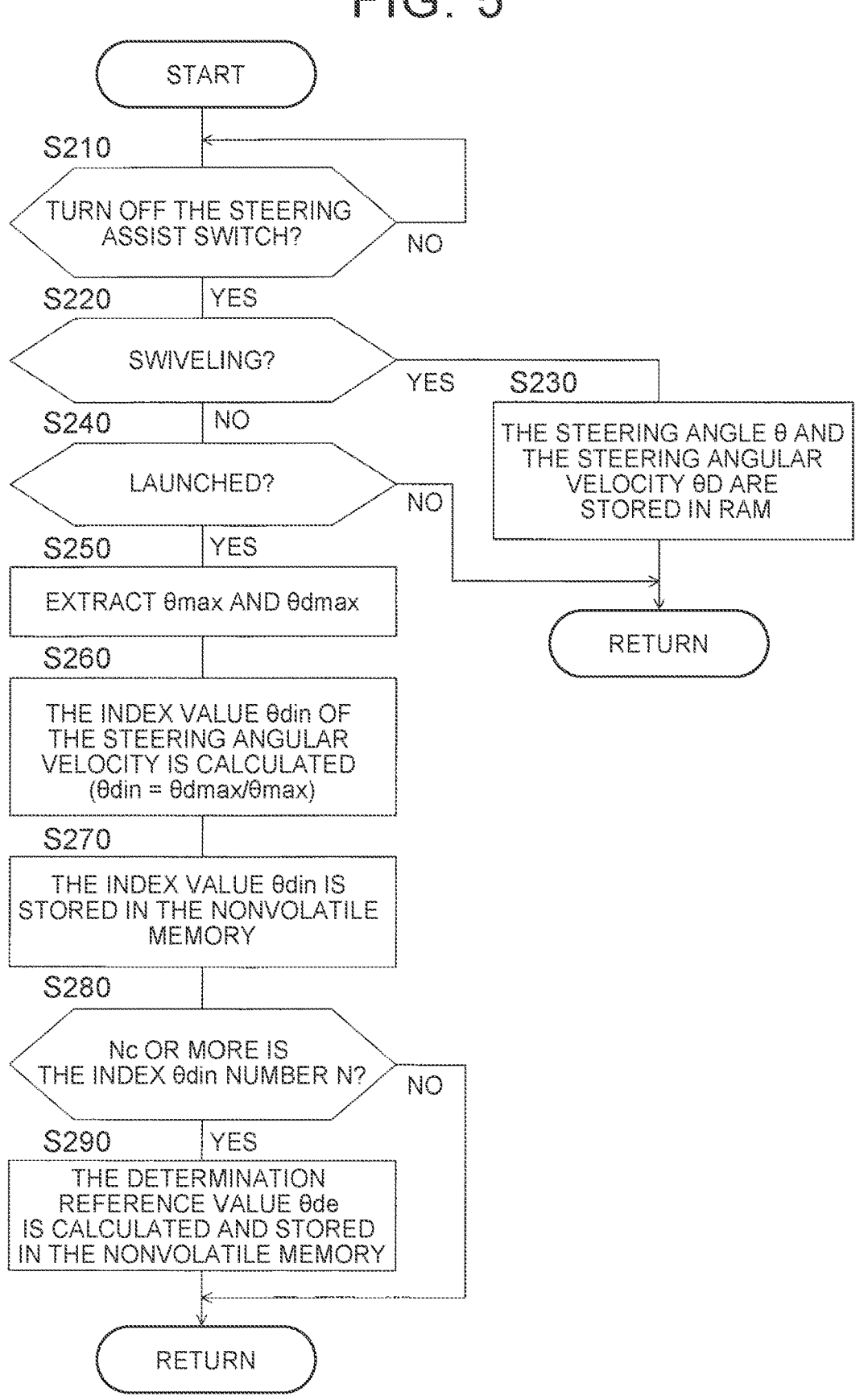
FIG. 5 is a flowchart illustrating an operation control routine of the determination reference value θdc according to the embodiment.

In the case of a vehicle capable of specifying a driver, such as a driver monitor, calculation control according to the flowchart shown in FIG. 5 may be performed for each driver, and the determination reference value θdc may be stored in a nonvolatile memory for each driver. Then, the driver may be specified at the start of the operation control according to the flowchart illustrated in FIG. 3, and the operation control according to the flowchart illustrated in FIG. 3 may be executed for the specified driver.

Operation of the Embodiment

Next, the operation of the steering assist device 100 according to the embodiment configured as described above will be described in various cases.

When A. Steering Assist Switch 54 is Turned Off

When the steering assist switch 54 is off, the determination reference value θdc is calculated for the incision steering and the return steering when the vehicle 60 travels in the curve in accordance with the flowchart shown in FIG. 5.

That is, when the vehicle 60 is turning (S220), the steering angle θ and the steering angular velocity θd are stored in RAM (S230), and when the turning of the vehicle is completed (S240), the maximum value θmax of the steering angle having the largest absolute value among the steering angle θ and the steering angular velocity θd stored in RAM and the maximum value θdmax of the steering angular velocity are extracted.

The index value θdin of the steering angular velocity is calculated as the half-dimensionless value θdmax/θmax obtained by dividing the maximum value θdmax of the steering angular velocity by the maximum value θmax of the steering angle (S260). Further, the determination reference value θdc is calculated based on the index value θdin of the steering angular velocity of the number N which is equal to or larger than the reference value Nc, and is stored in the rewritable nonvolatile memory. (S280, S290).

As described above, when the steering assist switch 54 is off, the target steering guiding torque Tsgt and the target steering angular velocity control torque Tavt are not calculated. Therefore, the control steering torque Tsc generated by EPS device 12 is controlled to be the sum Tbat+Tsa of the target basic assist torque Tbat and the steering assist torque Tsa.

When B. Steering Assist Switch 54 is on

As described above, when the steering assist switch 54 is on, the target steering guide torque Tsgt and the target steering angular velocity control torque Tavt are calculated in addition to the target steering guide torque Tsgt and the steering assist torque Tsa. The control steering torque Tsc generated by EPS device 12 is controlled to be the sum Tbat+Tsgt+Tavt+Tsa of the target basic assist torque Tbat, the target steering guide torque Tsgt, the target steering angular velocity control torque Tavt, and the steering assist torque Tsa.

In B-2~B-4 described below, since the target steering angular velocity control torque Tavt is 0, the sum Tbat+Tsgt+Tavt+Tsa is equal to the sum Tbat+Tsgt+Tsa. Therefore, the control steering torque Tsc is controlled to be the sum Tbat+Tsgt+Tsa of the target basic assist torque Tbat, the target steering guide torque Tsgt, and the steering assist torque Tsa.

The steering guide torque Tsg corresponding to the target steering guide torque Tsgt corrects the return torque so that the magnitude of the return torque Trea is reduced in an area where the magnitude of the steering angle θ is smaller than the magnitude of the target steering angle θt. Conversely, the steering guide torque Tsg corresponding to the target steering guide torque Tsgt corrects the return torque so that the magnitude of the return torque Trea is increased in an area where the magnitude of the steering angle θ is larger than the magnitude of the target steering angle θt. The correction amount of the return torque increases in a range in which the difference θ−θt between the steering angle and the target steering angle is θt−θc to θt+θc as the difference between the steering angle and the target steering angle increases.

Therefore, when the return steering is performed in an area where the magnitude of the steering angle θ is smaller than the magnitude of the target steering angle θt, the return torque Trea acting as the steering assist force is reduced, so that it is difficult to perform the return steering such that the steering angle is separated from the target steering angle. Further, when the increase steering is performed in an area in which the magnitude of the steering angle θ is larger than the magnitude of the target steering angle θt, the return torque Trea acting as the steering reaction force is increased, so that it is difficult to increase the steering angle so as to be separated from the target steering angle. Therefore, since the steering of the driver can be urged so that the steering angle θ becomes the target steering angle θt, the steering assistance can be performed so that the steering amount of the driver becomes the optimum steering amount while maintaining the main body feeling of the steering of the driver.

In addition, when the target steering angle θt is larger than the steering angle θ, since the return torque Trea is reduced by the steering guide torque Tsg corresponding to the target steering guide torque Tsgt, the reaction torque of the cut steering is reduced. Accordingly, steering of the driver is urged so that the steering angle θ becomes the target steering angle θt.

$$|\theta d(|>|\theta td| \text{ In the case} \qquad <B-1>$$

When the absolute value of the steering angular velocity θd is larger than the absolute value of the target steering angular velocity θtd, the target steering guide torque Tsgt is calculated in the step S110, and an affirmative determination is made in the step S130.

In step S140, the target steering angular velocity control torque Tavt is calculated, and in step S190, a signal indicating the target steering guide torque Tsgt and a signal indicating the target steering angular velocity control torque Tavt are outputted to EPS·ECU 40.

Therefore, the control steering torque Tsc is controlled to be the sum Tbat+Tsgt+Tavt+Tsa of the target basic assist torque Tbat, the target steering guide torque Tsgt, the target steering angular velocity control torque Tavt, and the steering assist torque Tsa. Consequently, the steering angular velocity control torque Tav corresponding to the target steering angular velocity control torque Tavt for suppress the steering angular velocity θd from becoming excessively large is generated. The steering angular velocity control torque Tav acts in a direction opposite to a direction in which the actual steering angle θ changes.

Therefore, when the actual steering angular velocity θd is higher than the target steering angular velocity θtd, the steering angular velocity control torque Tav corresponding to the target steering angular velocity control torque Tavt acts in a direction opposite to a direction in which the actual steering angle changes. Therefore, it is possible to suppress an increase in the difference θ−θt between the actual steering angular velocity and the target steering angular velocity as compared with a case where the control steering torque Tsc does not include the target steering angular velocity control torque Tavt, and thus it is possible to reduce a possibility that the steering velocity θd becomes excessive at the beginning of turning of the vehicle.

Further, the steering angular velocity control torque Tav corresponding to the target steering angular velocity control torque Tavt increases as the difference θ−θt between the actual steering angular velocity and the target steering angular velocity increases. Therefore, for example, compared with a case where the target steering angular velocity control torque Tavt is constant regardless of the magnitude of the difference θ−θt between the actual steering angular velocity and the target steering angular velocity, it is possible to appropriately suppress an increase in the difference θ−θt between the actual steering angular velocity and the target steering angular velocity, and thus it is possible to appropriately reduce the possibility that the steering velocity θd becomes excessive at the beginning of turning of the vehicle.

Further, a target steering guide torque Tsg corresponding to the target steering guide torque Tsgt is generated. Therefore, as in the case of A, since the steering of the driver can be urged so that the steering angle θ becomes the target steering angle θt, the steering assistance can be performed so that the steering amount of the driver becomes the optimum steering amount while maintaining the main body feeling of the steering of the driver. It should be noted that this advantageous effect can also be obtained in B-3 and B-4 described later.

$$|\theta d|\leq|\theta td| \text{ Where } sgn\theta adin\cdot(\theta adin-\theta dc)>\beta \qquad <B-2>$$

When the absolute value of the steering angular velocity θd is equal to or less than the absolute value of the target steering angular velocity θtd and the sgnθadin·(θadin−θdc) is larger than the reference value β, the target steering guide torque Tsgt is calculated in the step S110, and a negative determination is performed in the step S130. In step S145, the target steering angular velocity control torque Tavt is set to 0, and an affirmative determination is made in step S170. Further, in step S180, the target steering guide torque Tsgt is reduced to α·Tsgt, and in step S190, a signal indicating the reduced target steering guide torque Tsgt and a signal indicating the target steering angular velocity control torque Tavt (=0) are outputted to EPS·ECU 40. Therefore, the control steering torque Tsc is controlled to be the sum Tbat+Tsgt+Tsa of the target basic assist torque Tbat, the reduced target steering guide torque Tsgt, and the steering assist torque Tsa.

As described above, when the steering assist switch 54 is on, the return torque Trea is reduced by the steering guide torque Tsg corresponding to the target steering guide torque Tsgt. Therefore, it is considered that one factor that the index value θadin of the actual steering angular velocity becomes larger than the determination reference value θdc is that the return torque is reduced by the steering guide torque.

In B-2, as described above, it is possible to reduce the amount of reduction in the return torque Trea by the steering guide torque Tsg corresponding to the target steering guide torque Tsgt. Therefore, it is possible to reduce the degree to which the index value θadin of the actual steering angular velocity becomes larger than the determination reference value θdc as compared with the case where the target steering guide torque Tsgt is not reduced, and thus it is possible to reduce the possibility that the steering velocity at the beginning of turning of the vehicle becomes excessive.

In particular, the correction coefficient α decreases as the magnitude of the difference Δθadin between the index value θadin of the steering angular velocity and the determination reference value θdc increases, for example, 1−|Δθadin| When the calculation is performed, the correction coefficient α can be made smaller as the magnitude of the difference Δθadin is larger. Therefore, the larger the magnitude of the difference Δθadin is, the smaller the reduction in the return torque Trea due to the steering guide torque Tsg corresponding to the target steering guide torque Tsgt can be made.

$$|\theta d| \le |\theta td| \text{ Where } sgn\theta adin \cdot (\theta adin - \theta dc) > \beta \qquad \text{<B-3>}$$

When the absolute value of the steering angular velocity θd is equal to or less than the absolute value of the target steering angular velocity θtd and the sgnθadin (θadin−θdc) is equal to or less than the reference value β, the target steering guide torque Tsgt is calculated in the step S110 as in B-2, a negative determination is made in the step S130, and the target steering angular velocity control torque Tavt is set to 0 in the step S145. In step S170, since a negative determination is made and no step S180 is performed, the target steering guide torque Tsgt is not reduced. Therefore, in the step S190, a signal indicating the target steering guide torque Tsgt that is not reduced and a signal indicating the target steering angular velocity control torque Tavt (=0) are outputted to EPS·ECU 40. Therefore, the control steering torque Tsc is controlled to be a sum Tbat+Tsgt+Tsa of the target basic assist torque Tbat, the target steering guide torque Tsgt that is not reduced, and the steering assist torque Tsa.

$$|\theta d| \le |\theta td| \text{ When there is no determination reference}$$
$$\text{value } \theta dc \qquad \text{<B-4>}$$

When the absolute value of the steering angular velocity θd is equal to or less than the absolute value of the target steering angular velocity θtd and there is no determination reference value θdc, the target steering guide torque Tsgt is calculated in the step S110 as in the case of B-2 and B-3, a negative determination is made in the step S130, and the target steering angular velocity control torque Tavt is set to 0 in the step S145. In step S150, since a negative determination is made and no step S160~S180 is performed, the target steering guide torque Tsgt is not reduced. Therefore, as in B-3, in the step S190, a signal indicating the target steering guiding torque Tsgt and a signal indicating the target steering angular velocity control torque Tavt (=0) are outputted to EPS·ECU 40. Therefore, the control steering torque Tsc is controlled to be a sum Tbat+Tsgt+Tsa of the target basic assist torque Tbat, the target steering guide torque Tsgt that is not reduced, and the steering assist torque Tsa.

In particular, in the above-described embodiment, the index value θadin of the actual steering angular velocity is a half-dimensionless actual steering angular velocity θd/θ obtained by dividing the current steering angular velocity θd by the current steering angle θ (S160).

Figure 12:
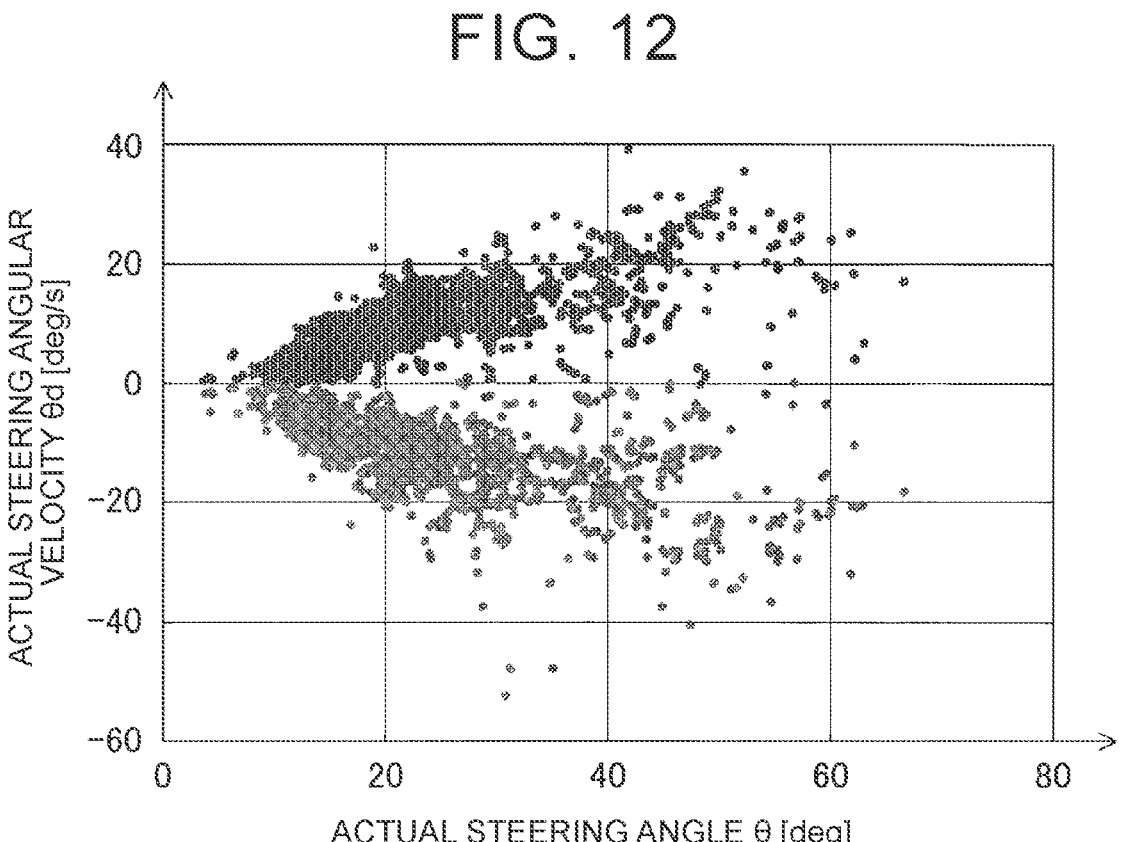
FIG. 12 is a diagram illustrating an example of a relationship between an actual steering angle θ and an actual steering angular velocity θd when a vehicle travels on curves of various curvatures at various vehicle speeds when the actual steering angle θ is positive.

FIG. 12 shows an example of the relationship between the actual steering angle θ and the actual steering angular velocity θd when the vehicle travels on curves of various curvatures at various vehicle speeds when the actual steering angle θ is positive. In FIG. 12, a dark gray point indicates a detection value when the cut steering is performed, and a light gray point indicates a detection value when the switch-back steering is performed.

As shown in FIG. 12, in both the case of the cut steering and the return steering, the variation of the detection value is large, but the value θd/θ obtained by dividing the actual steering angular velocity by the actual steering angle becomes a value with small variation regardless of the actual steering angle and the actual steering angular velocity. Therefore, according to the value θd/θ obtained by dividing the actual steering angular velocity by the actual steering angle, it is possible to obtain the index value θadin for appropriately determining whether or not the actual steering angular velocity is excessively large regardless of the actual steering angle and the actual steering angular velocity.

Further, in the above-described embodiment, the determination reference value θdc is a value obtained based on the half-dimensionless maximum steering angular velocity θdmax/θmax obtained by dividing the maximum value θdmax of the magnitude of the steering angular velocity when the vehicle 60 travels on the curve of the traveling road in a state where the steering assist switch 54 is off by the maximum value θmax of the magnitude of the steering angle (S220 to S290).

Therefore, according to the half-dimensionless maximum steering angular velocity θdmax/θmax, the determination reference value θdc for properly determining whether or not the actual steering angular velocity is excessive can be obtained regardless of the maximum value θmax of the magnitude of the steering angle and the maximum value θdmax of the magnitude of the steering angular velocity, similarly to the index value θadin of the actual steering angular velocity.

Further, in the above-described embodiment, the determination reference value θdc is calculated (S290) by calculating any one of the average value of the half-dimensionalized maximum steering angular velocity, the median value of the half-dimensionalized maximum steering angular velocity, the maximum value of the half-dimensionalized maximum steering angular velocity, and the percentile value of the half-dimensionalized maximum steering angular velocity in a situation where the number N of the half-dimensionalized maximum steering angular velocity θdmax/θmax is equal to or greater than a few Nc of the criterion (S280).

Therefore, the determination reference value can be calculated to an appropriate value as compared with a case where the determination reference value θdc is calculated based on a small number of half-dimensionless maximum steering angular velocities θdmax/θmax less than a few Nc of the reference.

Specific Example of Operation

Next, a specific example of the operation of the steering assist device 100 in the case where the vehicle 60 travels in a curve will be described.

Figure 13:
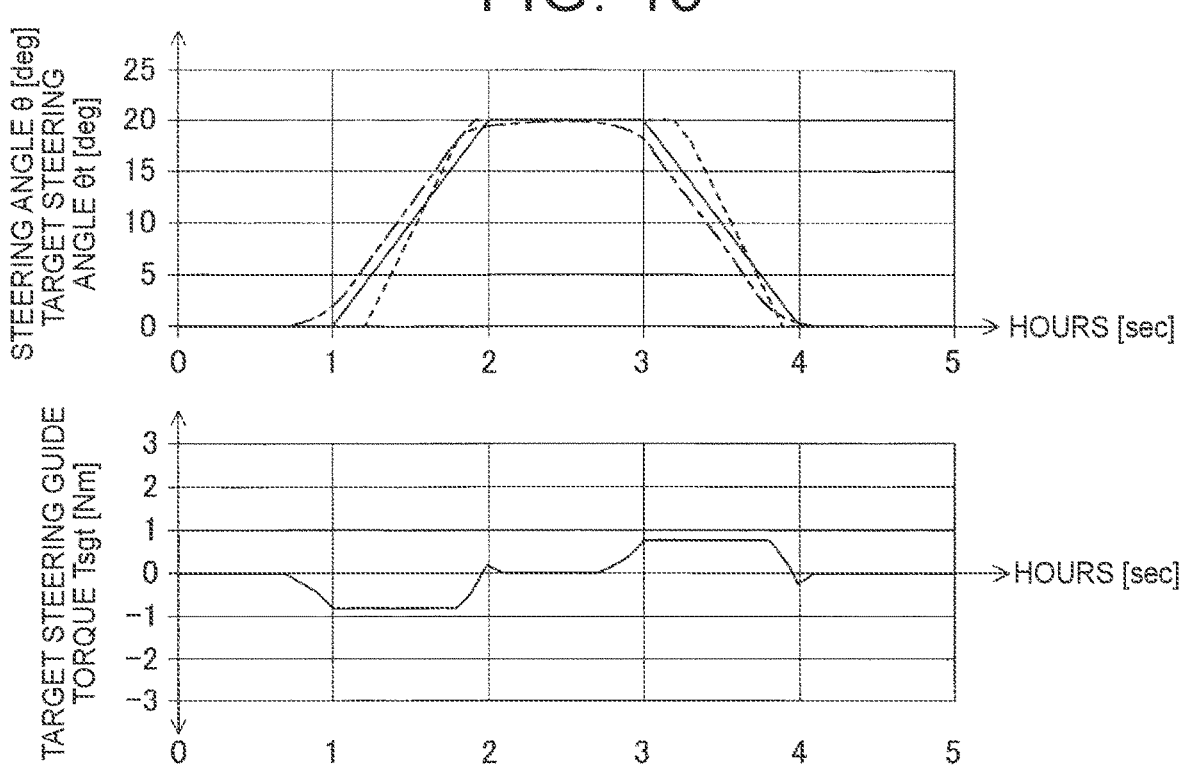
FIG. 13 is a diagram illustrating an example of a change in the target steering angle θt and the steering angle θ (upper stage) and an example of a change in the target steering guide torque Tsgt (lower stage)

The upper part of FIG. 13 illustrates an example of a change in the target steering angle θt and the steering angle θ, and the lower part of FIG. 13 illustrates an example of a change in the target steering guide torque Tsgt. In the upper part of FIG. 13, a broken line indicates a change in the steering angle θ when the steering assist switch 54 is off, and a dashed-dotted line indicates a change in the target steering angle θt when the steering assist switch 54 is on. Further, a solid line indicates a change in the steering angle θ when the steering assist switch 54 is on with respect to the driver that performs the steering operation in accordance with the steering assist by the steering assist device 100.

As shown in the lower part of FIG. 13, at the beginning of the curve travel (at the time of the cut steering), the target steering angle θt increases earlier than the steering angle θ indicated by the broken line, and the steering angle θ indicated by the solid line also increases earlier than the steering angle $\theta$ indicated by the broken line. As a result, the increase in the steering angle $\theta$ when the steering assist switch 54 is on may be more gentle than the increase in the steering angle $\theta$ when the steering assist switch 54 is off, so that the steering angular velocity $\theta d$ (inclination of the steering angle $\theta$) when the steering assist switch 54 is on is smaller than the steering angular velocity $\theta d$ when the steering assist switch 54 is off.

Further, at the end of the curve travel (at the time of the return steering), the target steering angle $\theta t$ decreases earlier than the steering angle $\theta$ indicated by the broken line, and the steering angle $\theta$ indicated by the solid line also decreases earlier than the steering angle $\theta$ indicated by the broken line. As a result, the decrease in the steering angle $\theta$ when the steering assist switch 54 is on may be gentler than the decrease in the steering angle $\theta$ when the steering assist switch 54 is off, so that the steering angular velocity $\theta d$ (inclination of the steering angle $\theta$) when the steering assist switch 54 is on is smaller than the steering angular velocity $\theta d$ when the steering assist switch 54 is off.

Figure 14:
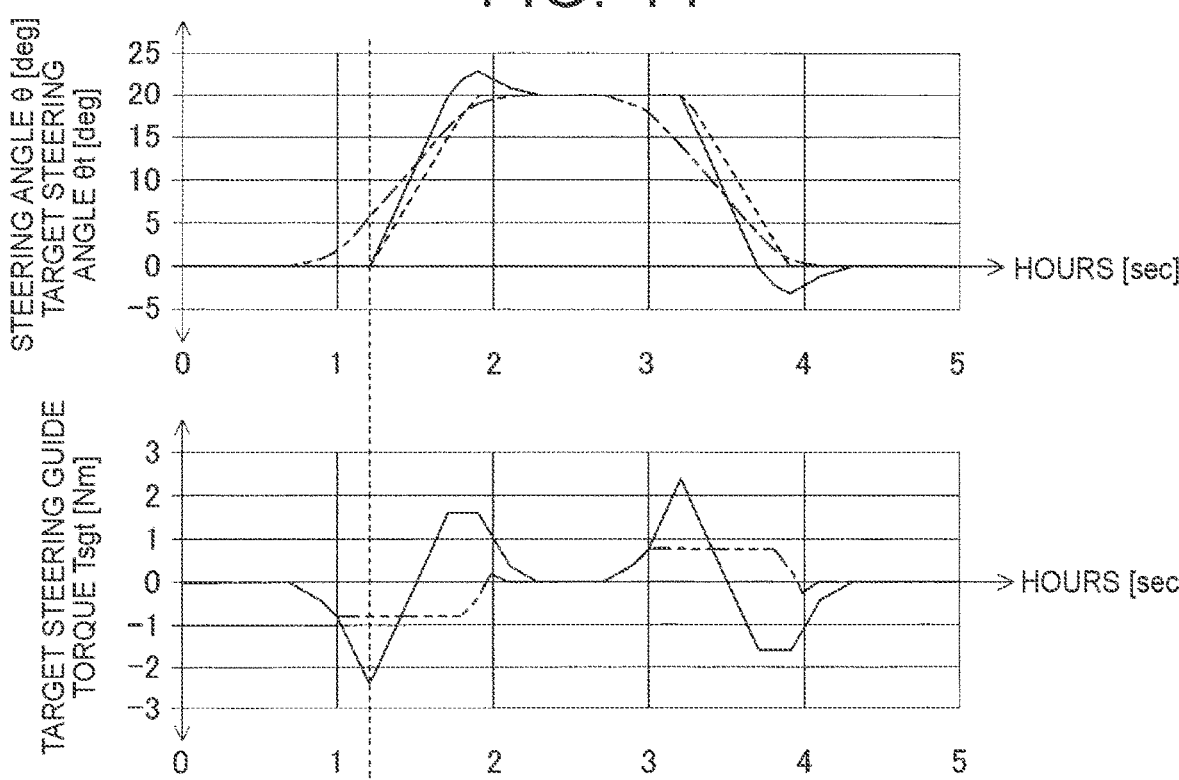
FIG. 14 is a diagram showing an example (upper stage) of a change in the target steering angle θt and the steering angle θ and an example (lower stage) of a change in the target steering guide torque Tsgt for a driver in which the steering assist device is a conventional steering assist device and the steering operation is performed without properly corresponding to the steering support by the steering assist device.

The upper part of FIG. 14 shows an example of a change in the target steering angle $\theta t$ and the steering angle $\theta$ for a driver whose steering assist device is a conventional steering assist device and which performs a steering operation without properly corresponding to the steering assistance by the steering assist device, and the lower part of FIG. 14 shows an example of a change in the target steering guide torque Tsgt. Note that the dashed line represents the change in the steering angle $\theta$ (dashed line) when the steering assist switch 54 is off and the change in the target steering angle $\theta t$ (dashed-dotted line) when the steering assist switch 54 is on, which are the same as the change in the steering angle $\theta$ and the change in the target steering angle $\theta t$ in the upper stage of FIG. 13, respectively. The driver that performs the steering operation without properly corresponding to the steering assistance is, for example, a person who performs the steering operation as in the case where the steering assistance switch is off even when the steering assist switch 54 is on, a person who cannot recognize the presence or absence of the steering guide torque Tsg, or the like.

As shown in the upper part of FIG. 14, even when the steering assist switch 54 is on, the start of the cut steering is not fast, and the timing is substantially the same as the timing when the steering assist switch 54 is off. Therefore, as shown in the lower part of FIG. 14, since the magnitude of the target steering-guide torque Tsgt at the beginning of the cut steering is increased, the reaction force of the cut steering is excessively reduced, and the cut steering is excessively promoted. As a result, at the beginning of the curve running, the steering angle $\theta$ increases abruptly, the steering angular velocity $\theta d$ becomes excessive, and an overshoot occurs in which the steering angle $\theta$ immediately before shifting to the steady turning becomes excessive temporarily.

Further, even when the steering assist switch 54 is on at the end of the curve travel, the start of the turning-back steering is not accelerated, and the timing is substantially the same as that in the case where the steering assist switch 54 is off. Therefore, as shown in the lower part of FIG. 14, since the magnitude of the target steering-guide torque Tsgt at the beginning of the switching-back steering increases, the auxiliary torque of the switching-back steering becomes excessive, and the switching-back steering is excessively promoted. As a result, at the end of the curve running, the steering angle $\theta$ suddenly decreases, the steering angular velocity $\theta d$ becomes excessive, and an overshoot occurs in which the steering angle $\theta$ immediately before shifting to the steady turning temporarily becomes excessive (the magnitude is excessively large with a negative value).

As described above, when the absolute value of the steering angular velocity $\theta d$ is larger than the absolute value of the target steering angular velocity $\theta td$ (in the above B-1), the target steering angular velocity control torque Tavt is calculated (S140), and a signal indicating the target steering angular velocity control torque Tavt is outputted to EPS·ECU 40 together with a signal indicating the target steering guide torque Tsgt (S190).

Figure 15:
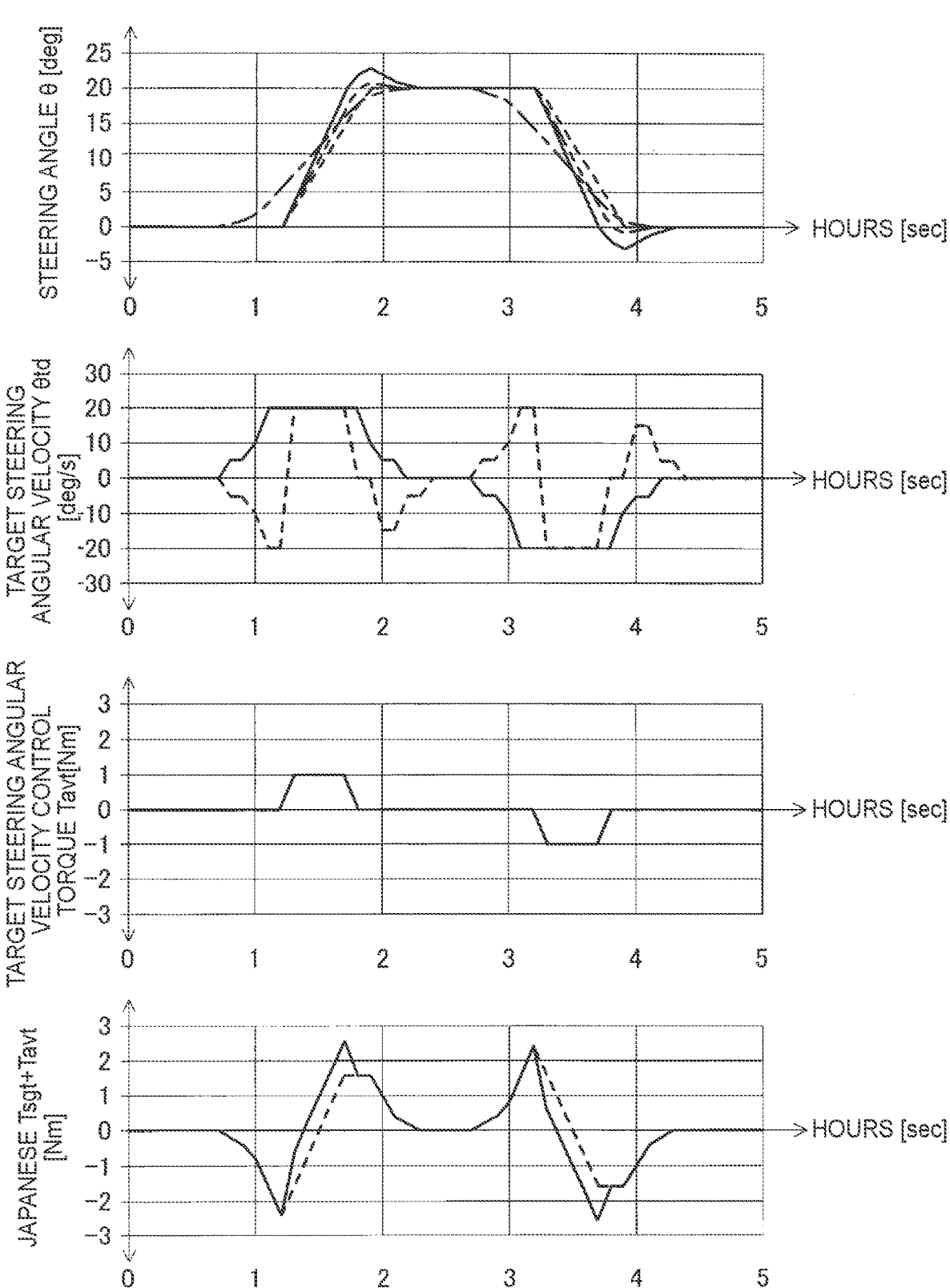
FIG. 15 is a diagram illustrating an example of a change in the steering angular velocity θd and the like in a case where the target steering angle θt and the steering angle θ change in the same manner as in FIGS. 12 and 13.

FIG. 15 shows an example of a change in the steering angular velocity $\theta d$ and the like in a case where the target steering angle $\theta t$ and the steering angle $\theta$ change in the same manner as in FIGS. 13 and 14. In FIG. 15, the reference value $\beta$ in the determination of S170 of steps is 0. It is assumed that the target steering angular velocity control torque Tavt becomes a positive value when the sign of the steering angular velocity deviation Md ($=\theta d - \theta td$) is the same as the sign of the target steering angular velocity $\theta td$, and becomes a negative value when the sign of the steering angular velocity deviation Md is not the same as the sign of the target steering angular velocity $\theta td$.

In FIG. 15, the dashed line and the solid line in the uppermost stage indicate changes in the target steering angle $\theta t$ and the steering angle $\theta$, respectively, and the solid line and the broken line in the second stage indicate changes in the target steering angular velocity $\theta td$ and the difference $\Delta\theta d$ ($=\theta d - \theta td$) between the steering angular velocities, respectively. The solid line of the third stage indicates the target steering angular velocity control torque Tavt, the dashed line of the fourth stage indicates the target steering guide torque Tsgt, and the solid line of the fourth stage indicates the sum Tsgt+Tavt of the target steering guide torque Tsgt and the target steering angular velocity control torque Tavt.

As shown in the third and fourth stages of FIG. 15, the target steering angular velocity control torque Tavt acts in a direction to suppress a change in the steering angle $\theta$ in the second half of the cut steering region and in the second half of the return steering region. Therefore, in the uppermost stage of FIG. 15, as indicated by the two-dot chain line, it is possible to reduce the overshoot of the steering angle $\theta$ immediately before the transition from the cut steering to the steady turning and the overshoot of the steering angle $\theta$ immediately before the transition from the switch-back steering to the steady turning.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, the curvature degree acquisition device that acquires the curve curvature ppre of the read-ahead position as the curvature degree of the traveling road ahead of the vehicles 60 is the camera sensor 52 and the steering assistance ECU 50. However, the curve curvature ppre of the read-ahead position may be obtained based on an upper portion from the navigation device 56.

Further, in the above-described embodiment, the calculation control of the target steering guide torque Tsgt and the target steering angular velocity control torque Tavt according to the flow chart shown in FIG. 3 is individually executed at the time of the turning steering and at the time of the turning-back steering. In addition, the calculation control of the determination reference value θdc according to the flowchart shown in FIG. 5 is also executed individually at the time of turning steering and at the time of turning-back steering. However, the calculation control of the target steering guide torque Tsgt and the target steering angular velocity control torque Tavt and the calculation control of the determination reference value θdc may be modified so as to be executed only for one of the turning steering and the returning steering.

Further, in the above-described embodiment, the steering device 10 is a steering device in which the steering wheel 14 and the left and right front wheel 16FL, 16FR are mechanically connected to each other and includes the electric power steering device 12. However, the vehicle steering assist device according to the present disclosure may be applied to a vehicle in which the steering device is a steer-by-wire type steering device. When the steering device is a steer-by-wire type steering device, the return torque Trea after the modification may be generated by an actuator that applies a steering reaction force to the steering wheel.

Further, in the above-described embodiment, the steering input member is the steering wheel 14 which is rotationally operated, but may be, for example, a joystick type steering input member which is pivotally operated.

What is claimed is:

1. A vehicle steering assist device comprising:
a turning device configured to turn a turning wheel in accordance with a steering operation amount applied to a steering input member by a driver, and configured to apply a return torque for urging the steering input member to a neutral position to the steering input member, the return torque being a torque that increases as the steering operation amount increases;
a control steering torque generating device that generates a control steering torque for correcting the return torque;
a control unit that controls the control steering torque generating device;
a curvature degree acquisition device that acquires a curvature degree of a traveling road in front of a vehicle;
a vehicle speed detecting device; and
a steering assist switch,
wherein when the steering assist switch is turned on, the control unit calculates a target steering angle for causing the vehicle to travel along a traveling road based on the curvature degree of the traveling road acquired by the curvature degree acquisition device and a vehicle speed detected by the vehicle speed detecting device,
wherein the control unit calculates a target steering guide torque for facilitating a steering angle to become the target steering angle by reducing the return torque in an area where the steering angle is smaller than the target steering angle,
wherein the control unit is configured to control the control steering torque generating device to cause the control steering torque generating device to generate the control steering torque including the target steering guiding torque,
wherein the control unit calculates an actual steering angular velocity based on the steering angle when the steering assist switch is turned on,
wherein the control unit calculates a target steering angular velocity based on the target steering angle,
wherein when the actual steering angular velocity is higher than the target steering angular velocity, the control unit calculates a target steering angular velocity control torque acting in a direction opposite to a direction in which the actual steering angle changes, and
wherein the control unit controls the control steering torque generating device to cause the control steering torque generating device to generate a control steering torque including a sum of the target steering guide torque and the target steering angular velocity control torque,
wherein the control unit is configured to:
calculate a determination reference value for a steering angular velocity based on a maximum steering angular velocity when the vehicle travels on a curve of the traveling road, in a situation where the steering assist switch is turned off,
reduce a magnitude of the target steering guide torque when the actual steering angular velocity is smaller than the target steering angular velocity and an index value of the actual steering angular velocity is higher than the determination reference value, in a situation where the steering assist switch is turned on; and
control the control steering torque generating device to cause the control steering torque generating device to generate a control steering torque that includes the target steering guide torque with a reduced magnitude of the target steering guide torque and that does not include the target steering angular velocity control torque.

2. The vehicle steering assist device according to claim 1, wherein the control unit is configured to calculate the target steering angular velocity control torque so as to increase the target steering angular velocity control torque as a difference between the actual steering angular velocity and the target steering angular velocity increases.

3. The vehicle steering assist device according to claim 1, wherein the control unit is configured to:
calculate a positive correction coefficient smaller than 1 such that the correction coefficient becomes smaller as a magnitude of a difference between the index value of the actual steering angular velocity and the determination reference value becomes larger; and
reduce the target steering guide torque by multiplying the target steering guide torque by the correction coefficient.

4. The vehicle steering assist device according to claim 1, wherein the control unit is configured to:
control the control steering torque generating device to cause the control steering torque generating device to generate a control steering torque that includes the target steering guide torque and that does not include the target steering angular velocity control torque, when the actual steering angular velocity is smaller than the target steering angular velocity and an index value of the actual steering angular velocity is not higher than the determination reference value, in a situation where the steering assist switch is turned on.

5. The vehicle steering assist device according to claim 1, wherein the index value of the actual steering angular velocity is a half-dimensionless steering angular velocity obtained by dividing a current steering angular velocity by a current steering angle.

6. The vehicle steering assist device according to claim 1, wherein the determination reference value is a value obtained based on a half-dimensionless maximum steering angular velocity obtained by dividing a maximum value of a magnitude of a steering angular velocity when the vehicle travels on a curve of the traveling road in a state where the steering assist switch is turned off by a maximum value of a magnitude of a steering angle.

7. The vehicle steering assist device according to claim 6, wherein the control unit is configured to calculate the determination reference value by calculating one of an average value of the half-dimensionless maximum steering angular velocity, a median of the half-dimensionless maximum steering angular velocity, a maximum value of the half-dimensionless maximum steering angular velocity, and a percentile value of the half-dimensionless maximum steering angular velocity, in a state in which the number of the half-dimensionless maximum steering angular velocities is equal to or more than the number of a reference.

8. A vehicle steering assist device comprising:

a turning device configured to turn a turning wheel in accordance with a steering operation amount applied to a steering input member by a driver, and configured to apply a return torque for urging the steering input member to a neutral position to the steering input member, the return torque being a torque that increases as the steering operation amount increases;

a control steering torque generating device that generates a control steering torque for correcting the return torque;

a control unit that controls the control steering torque generating device;

a curvature degree acquisition device that acquires a curvature degree of a traveling road in front of a vehicle;

a vehicle speed detecting device; and a steering assist switch, wherein when the steering assist switch is turned on, the control unit calculates a target steering angle for causing the vehicle to travel along a traveling road based on the curvature degree of the traveling road acquired by the curvature degree acquisition device and a vehicle speed detected by the vehicle speed detecting device, wherein the control unit calculates a target steering guide torque for facilitating a steering angle to become the target steering angle by reducing the return torque in an area where the steering angle is smaller than the target steering angle, wherein the control unit is configured to control the control steering torque generating device to cause the control steering torque generating device to generate the control steering torque including the target steering guiding torque, wherein the control unit calculates an actual steering angular velocity based on the steering angle when the steering assist switch is turned on, wherein the control unit calculates a target steering angular velocity based on the target steering angle, wherein when the actual steering angular velocity is higher than the target steering angular velocity, the control unit calculates a target steering angular velocity control torque acting in a direction opposite to a direction in which the actual steering angle changes, and wherein the control unit controls the control steering torque generating device to cause the control steering torque generating device to generate a control steering torque including a sum of the target steering guide torque and the target steering angular velocity control torque, wherein the control unit is configured to:

calculate a determination reference value for a steering angular velocity based on a maximum steering angular velocity when the vehicle travels on a curve of the traveling road, in a situation where the steering assist switch is turned off; and control the control steering torque generating device to cause the control steering torque generating device to generate a control steering torque that includes the target steering guide torque and that does not include the target steering angular velocity control torque, when the actual steering angular velocity is smaller than the target steering angular velocity and an index value of the actual steering angular velocity is not higher than the determination reference value, in a situation where the steering assist switch is turned on.

9. The vehicle steering assist device according to claim 8, wherein the index value of the actual steering angular velocity is a half-dimensionless steering angular velocity obtained by dividing a current steering angular velocity by a current steering angle.

10. The vehicle steering assist device according to claim 8, wherein the determination reference value is a value obtained based on a half-dimensionless maximum steering angular velocity obtained by dividing a maximum value of a magnitude of a steering angular velocity when the vehicle travels on a curve of the traveling road in a state where the steering assist switch is turned off by a maximum value of a magnitude of a steering angle.

11. The vehicle steering assist device according to claim 10, wherein the control unit is configured to calculate the determination reference value by calculating one of an average value of the half-dimensionless maximum steering angular velocity, a median of the half-dimensionless maximum steering angular velocity, a maximum value of the half-dimensionless maximum steering angular velocity, and a percentile value of the half-dimensionless maximum steering angular velocity, in a state in which the number of the half-dimensionless maximum steering angular velocities is equal to or more than the number of a reference.

* * * * *